US012125432B2

(12) United States Patent
Jung et al.

(10) Patent No.: US 12,125,432 B2
(45) Date of Patent: Oct. 22, 2024

(54) CLUSTER PIXEL CIRCUIT AND DIGITAL DISPLAY SYSTEM

(71) Applicant: SAPIEN SEMICONDUCTORS INC., Sengnam-si (KR)

(72) Inventors: Dae Young Jung, Seoul (KR); Geun Taek Lee, Seoul (KR); Hyun Tae Jung, Seoul (KR); Jong Gu Jeon, Seoul (KR); Myunghee Lee, Seoul (KR)

(73) Assignee: Sapien Semiconductors Inc., Sengnam-si (KR)

( * ) Notice: Subject to any disclaimer, the term of this patent is extended or adjusted under 35 U.S.C. 154(b) by 0 days.

(21) Appl. No.: 18/447,509

(22) Filed: Aug. 10, 2023

(65) Prior Publication Data

US 2024/0054947 A1 Feb. 15, 2024

(30) Foreign Application Priority Data

Aug. 11, 2022 (KR) ........................ 10-2022-0100516
Oct. 21, 2022 (KR) ........................ 10-2022-0136814
Jun. 28, 2023 (KR) ........................ 10-2023-0083279

(51) Int. Cl.
*G09G 3/32* (2016.01)
*G09G 3/20* (2006.01)

(52) U.S. Cl.
CPC ............. *G09G 3/32* (2013.01); *G09G 3/2014* (2013.01); *G09G 2300/0452* (2013.01); *G09G 2310/0286* (2013.01)

(58) Field of Classification Search
CPC ............. G09G 3/32; G09G 2300/0426; G09G 2300/0452; G09G 2300/0439
See application file for complete search history.

(56) References Cited

U.S. PATENT DOCUMENTS 9,930,277 B2 * 3/2018 Cok ......................... G09G 3/20
2016/0099262 A1 * 4/2016 Lin ....................... H01L 27/124 257/43
2017/0187976 A1 * 6/2017 Cok ....................... H04N 25/74
2018/0197471 A1 * 7/2018 Rotzoll ................ G09G 3/2003
2022/0122520 A1 * 4/2022 Cok ..................... G09G 3/2088

FOREIGN PATENT DOCUMENTS

KR 10-2022-0072535 A 6/2022

OTHER PUBLICATIONS

Communication dated May 17, 2024 issued by the Korean Patent Office in application No. 10-2023-0083279.
Korean Office Action for KR Patent Application No. 10-2023-0108970 issued on Jul. 4, 2024 from Korean Intellectual Property Office Action (KIPO).

* cited by examiner

*Primary Examiner* — Koosha Sharifi-Tafreshi
(74) *Attorney, Agent, or Firm* — Sughrue Mion, PLLC

(57) ABSTRACT

Disclosed is a digital display system based on a common interface. More particularly, a cluster pixel circuit includes a row terminal connected to a row line for receiving PWM (Pulse Width Modulation) clock signal; a column terminal connected to a column line for receiving N-bit data; a first individual pixel driver for driving a first pixel in the cluster pixel; and a second individual pixel driver connected to the first individual pixel driver and for driving a second pixel in the cluster pixel.

13 Claims, 25 Drawing Sheets

【FIG. 1】
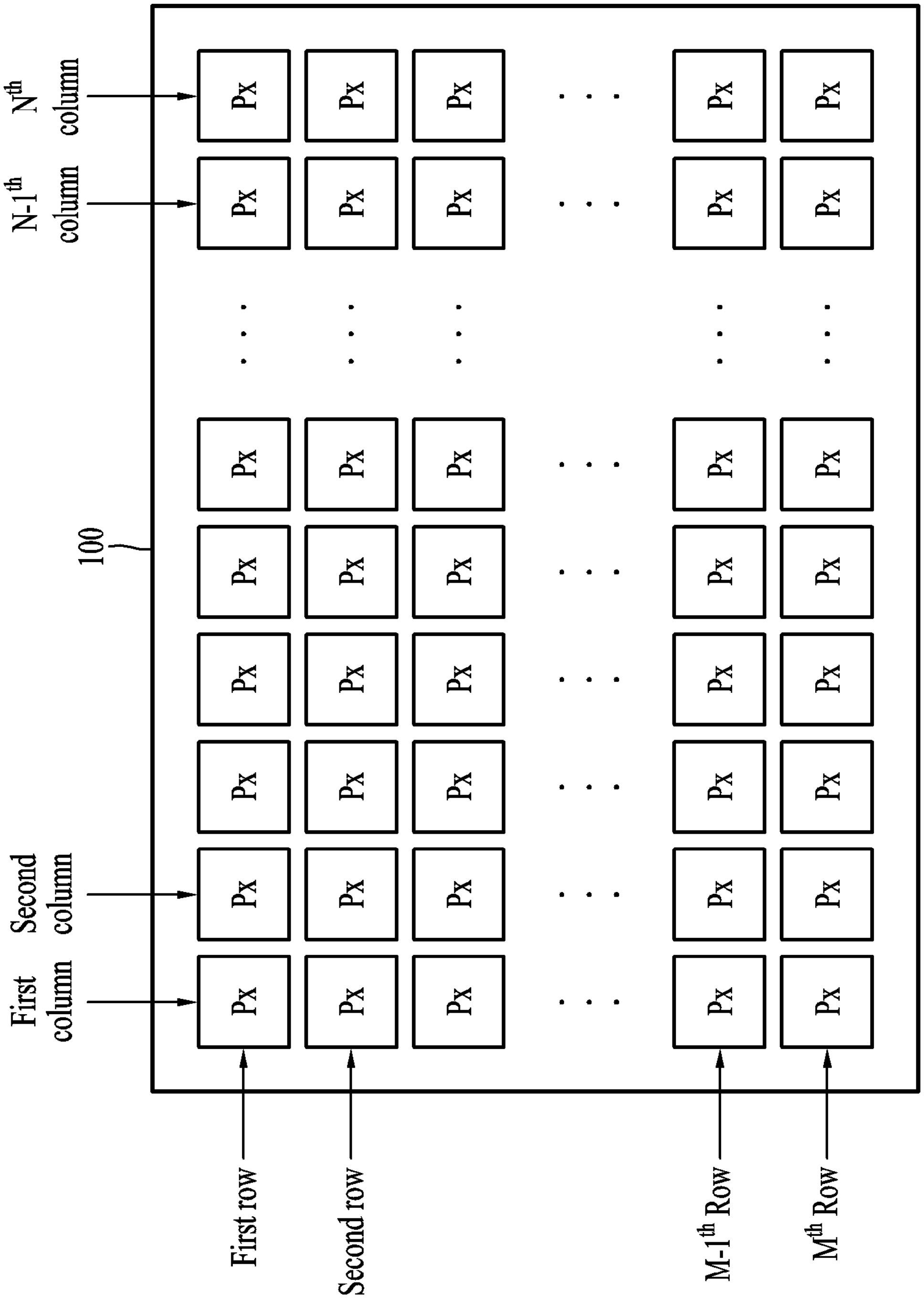

【FIG. 2】
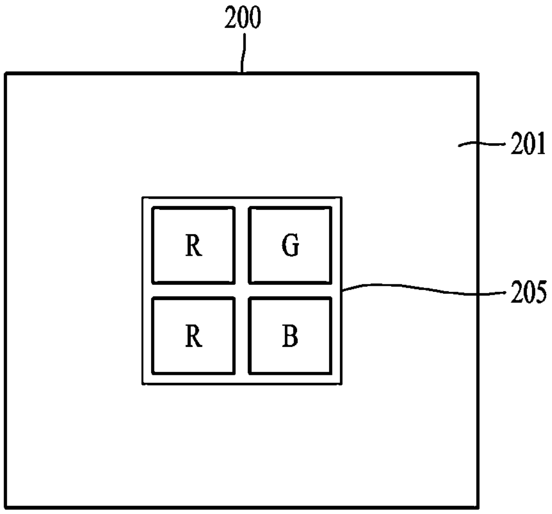
【FIG. 3】
(RELATED ART)
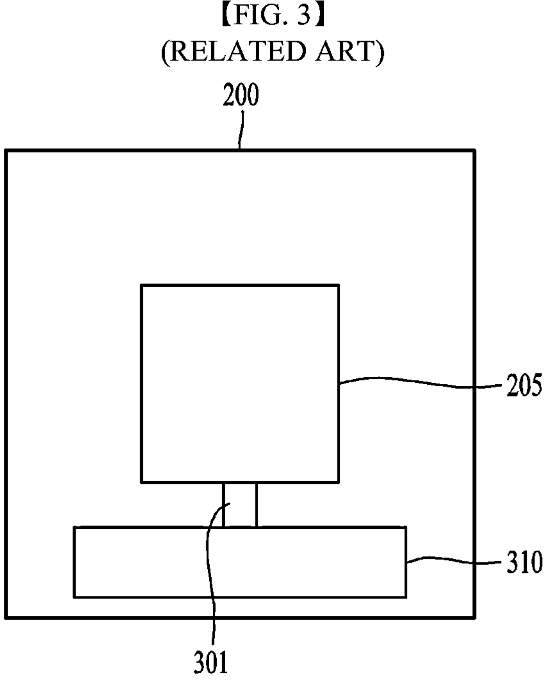

【FIG. 4A】
(RELATED ART)
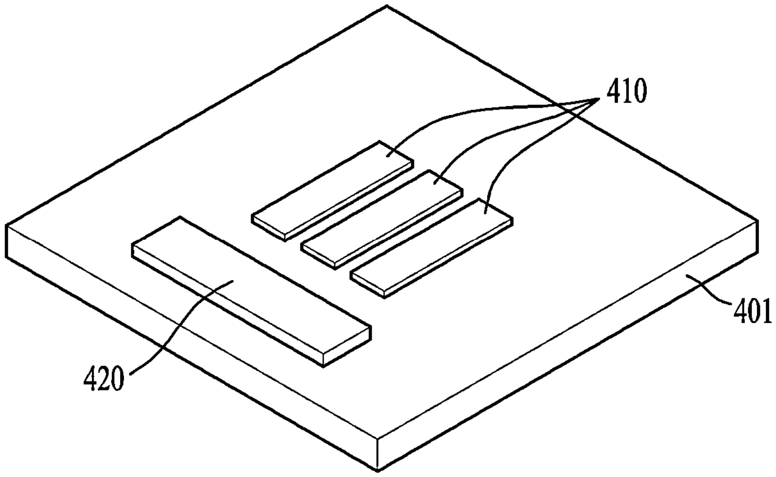
【FIG. 4B】
(RELATED ART)
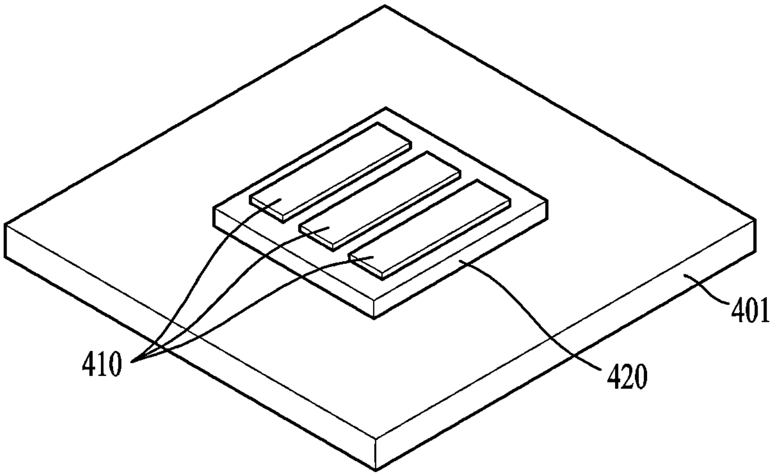

【FIG. 5】
(RELATED ART)
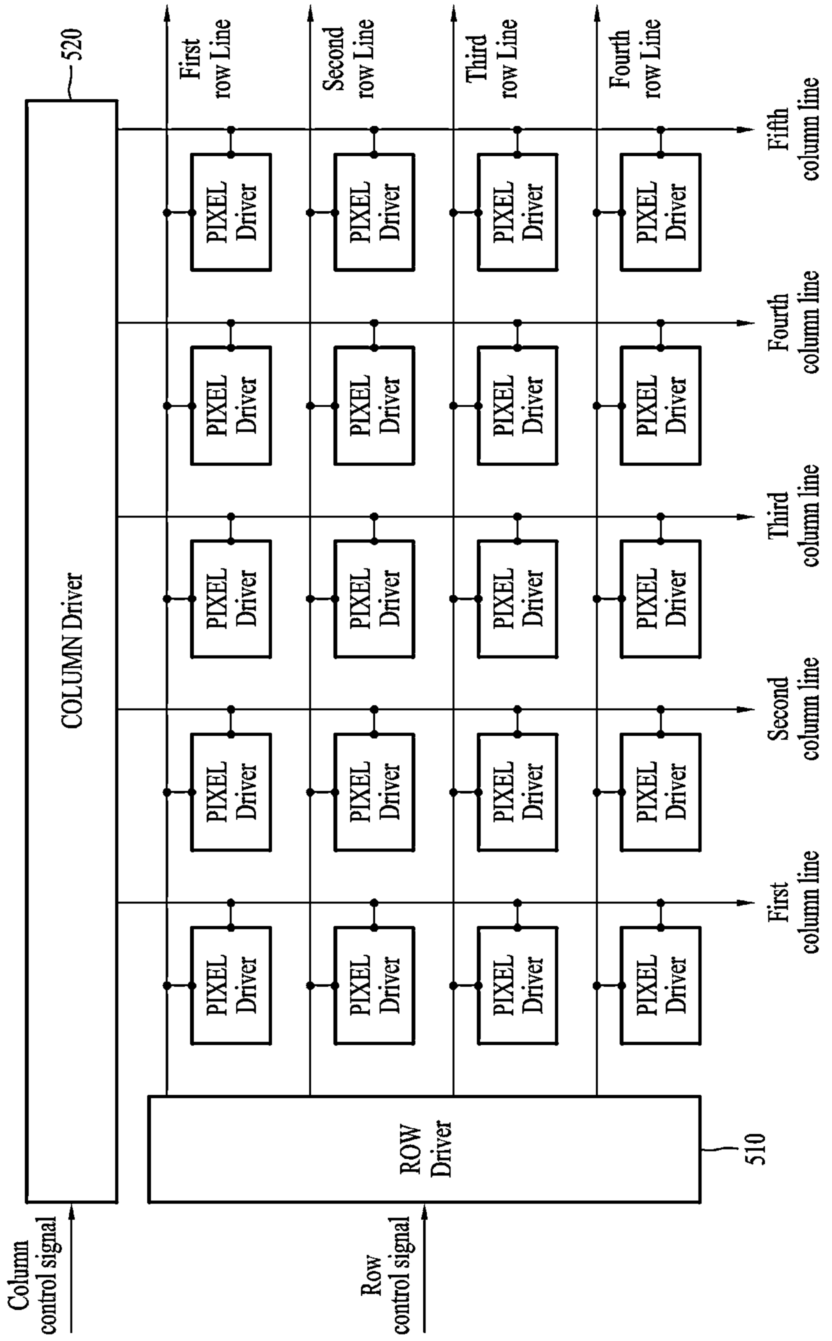

【FIG. 6】
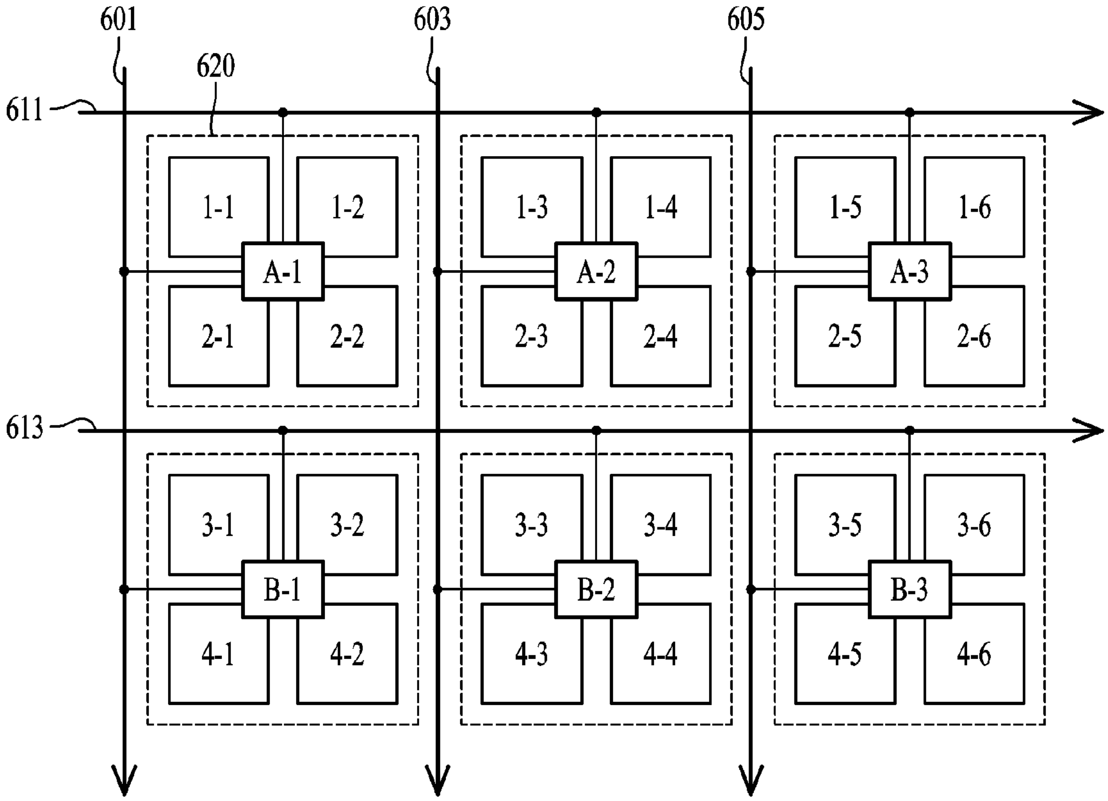

【FIG. 7】
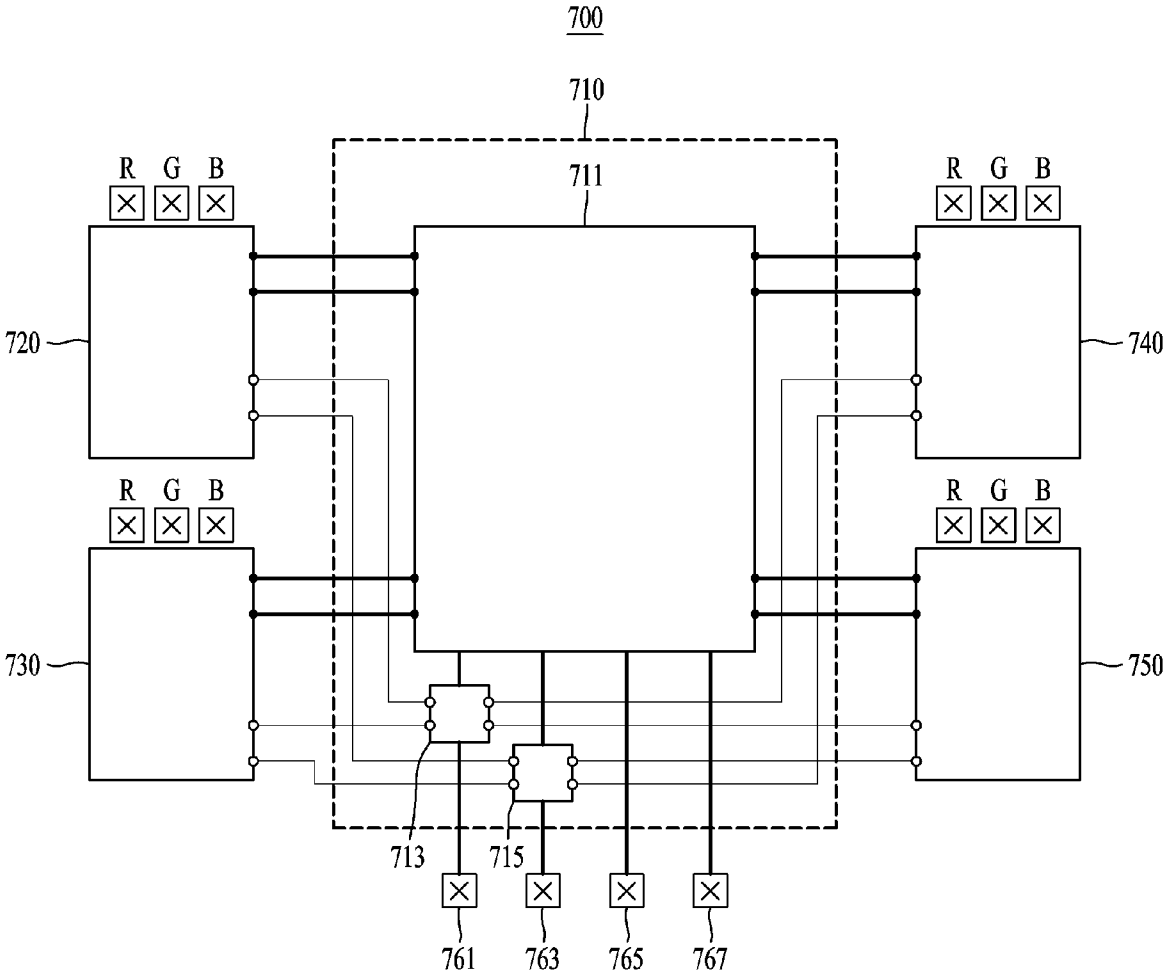

【FIG. 8】
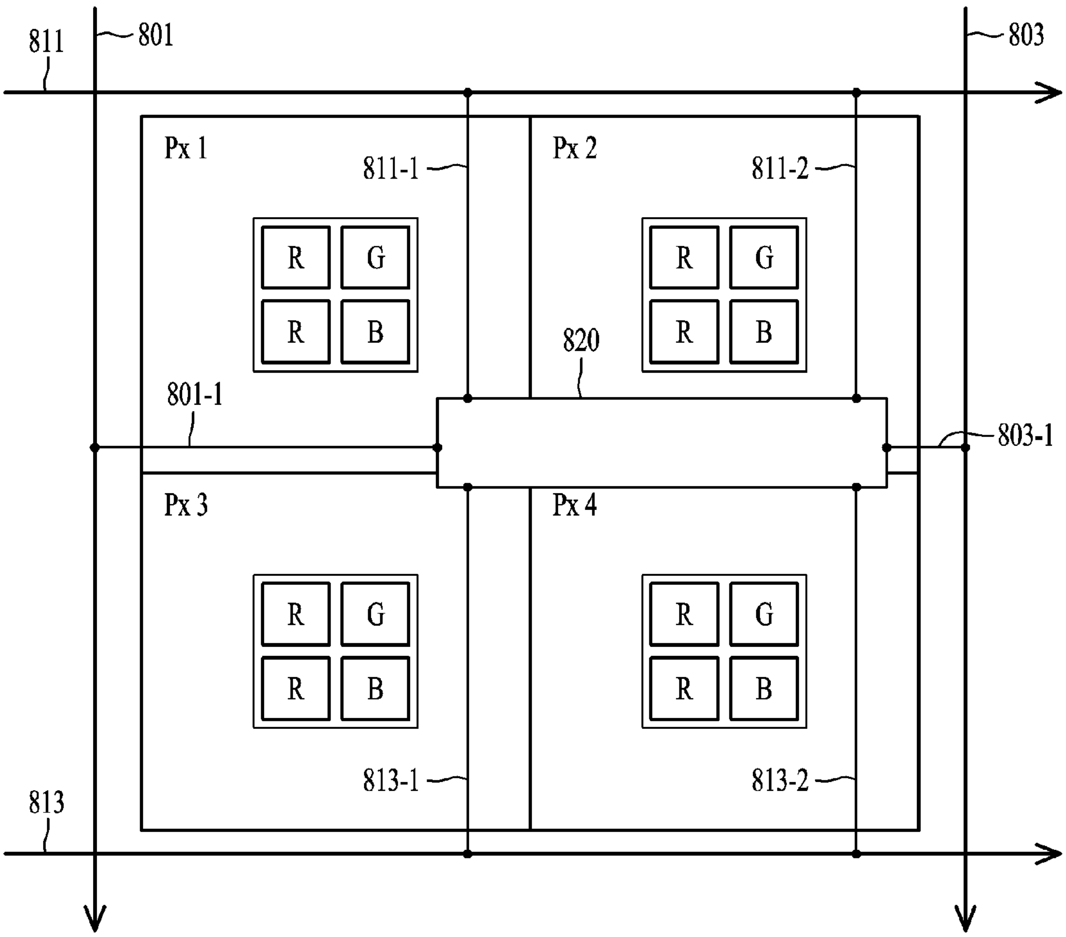

【FIG. 9】
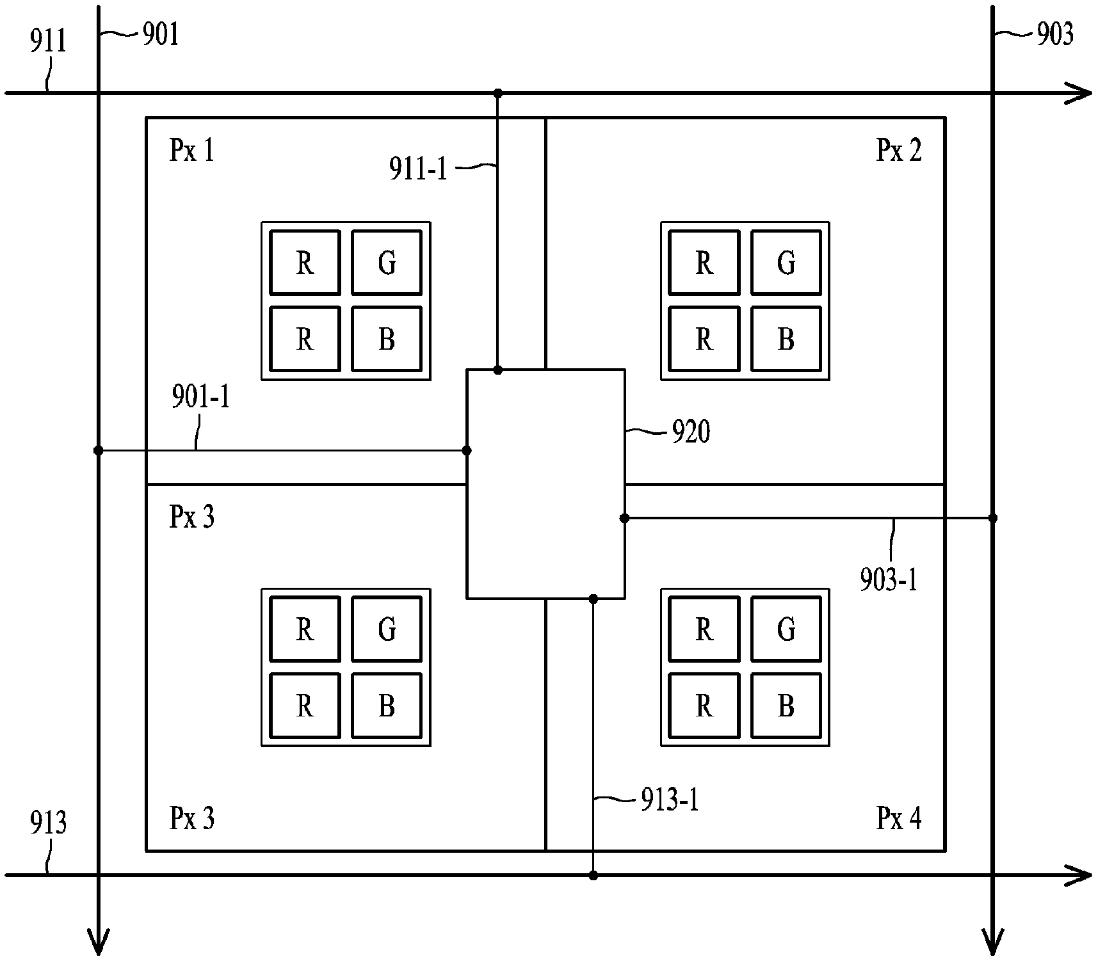

【FIG. 10】
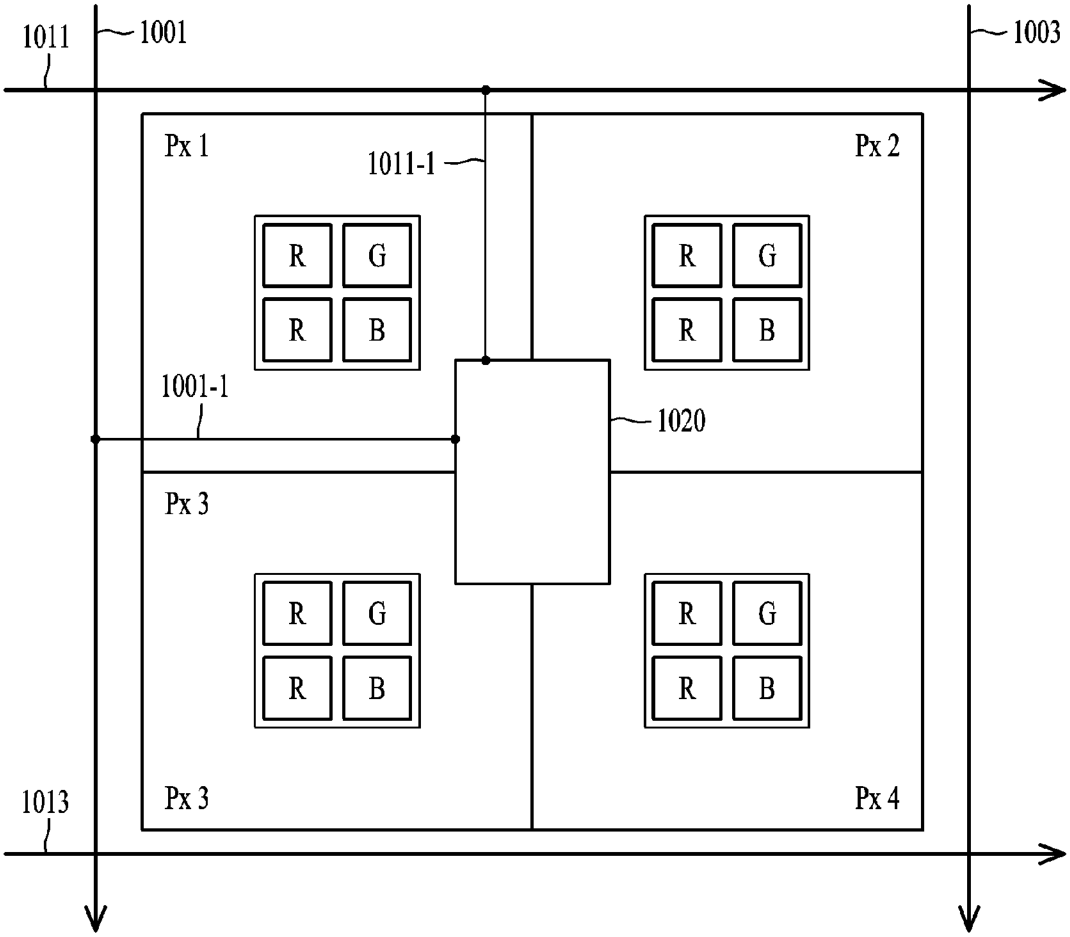

【FIG. 11】
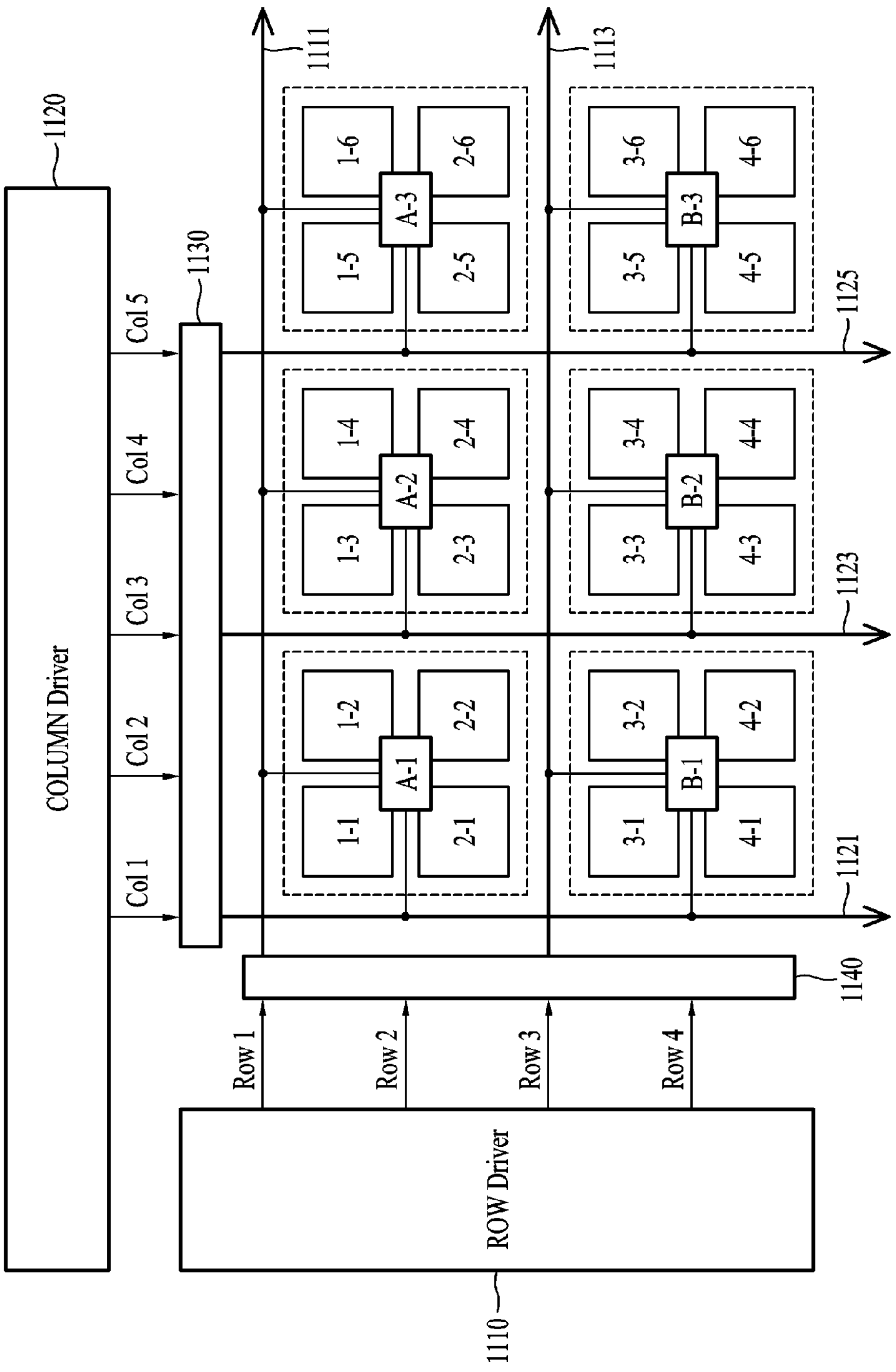

【FIG. 12】
(RELATED ART)
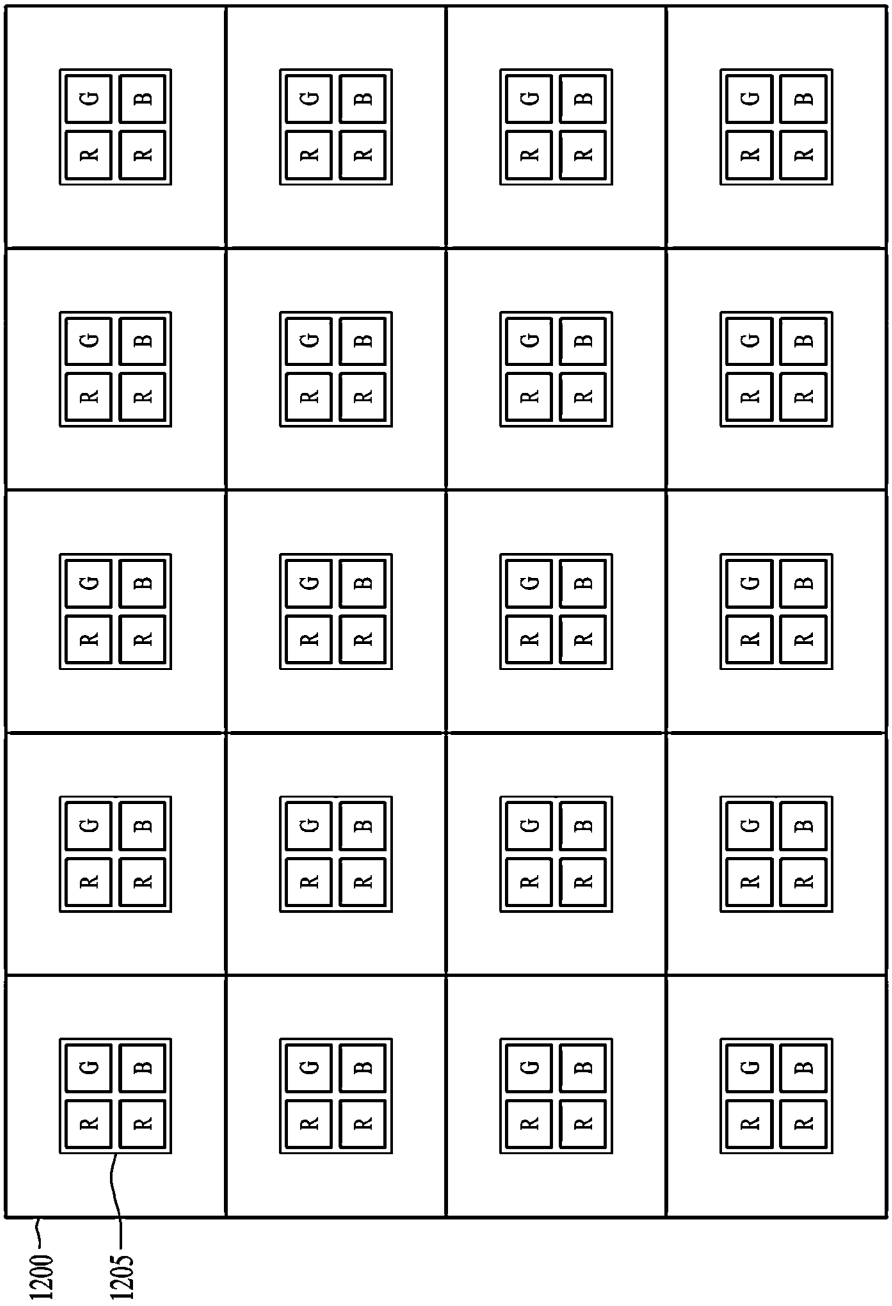

【FIG. 13A】
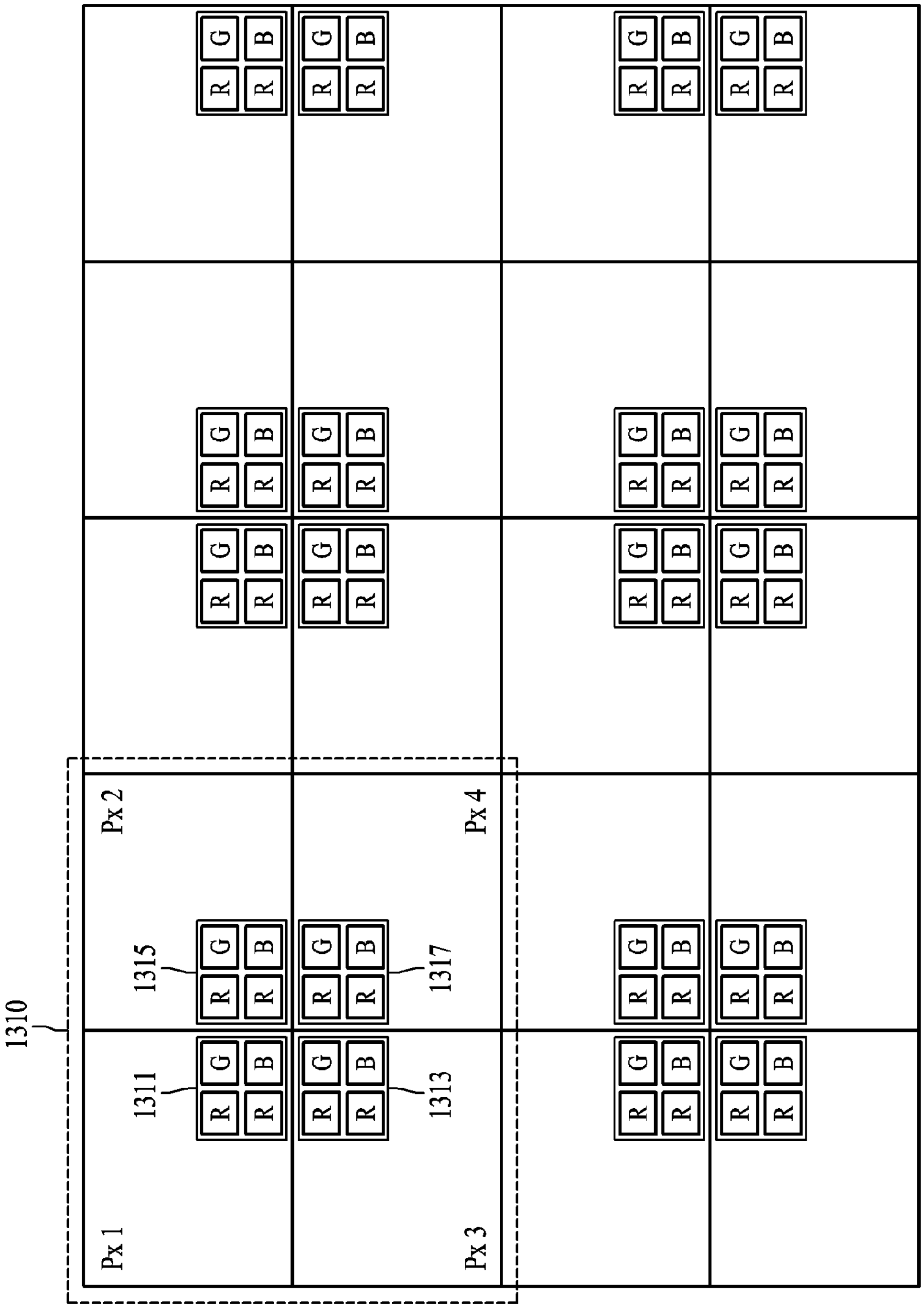

【FIG. 13B】
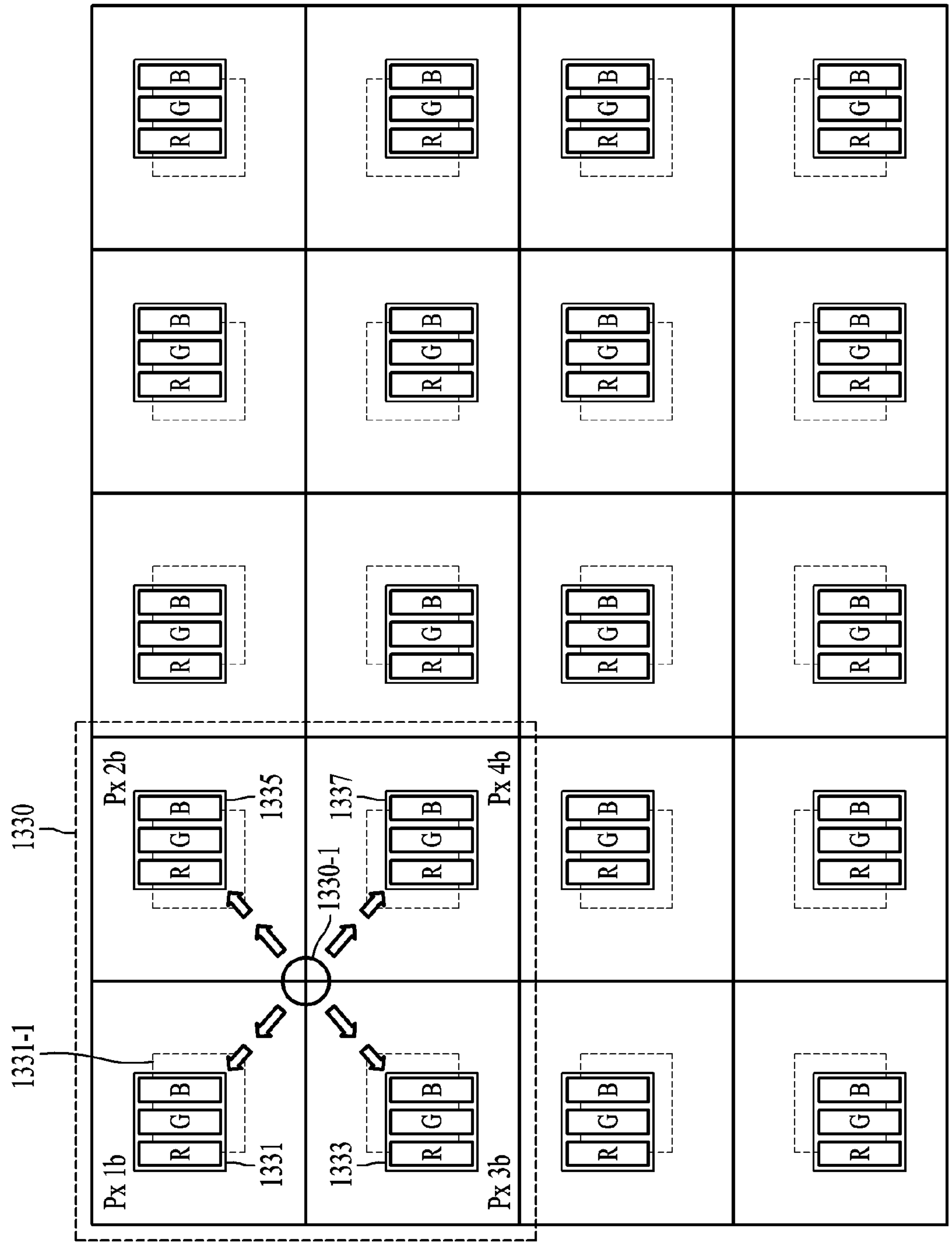

【FIG. 14】
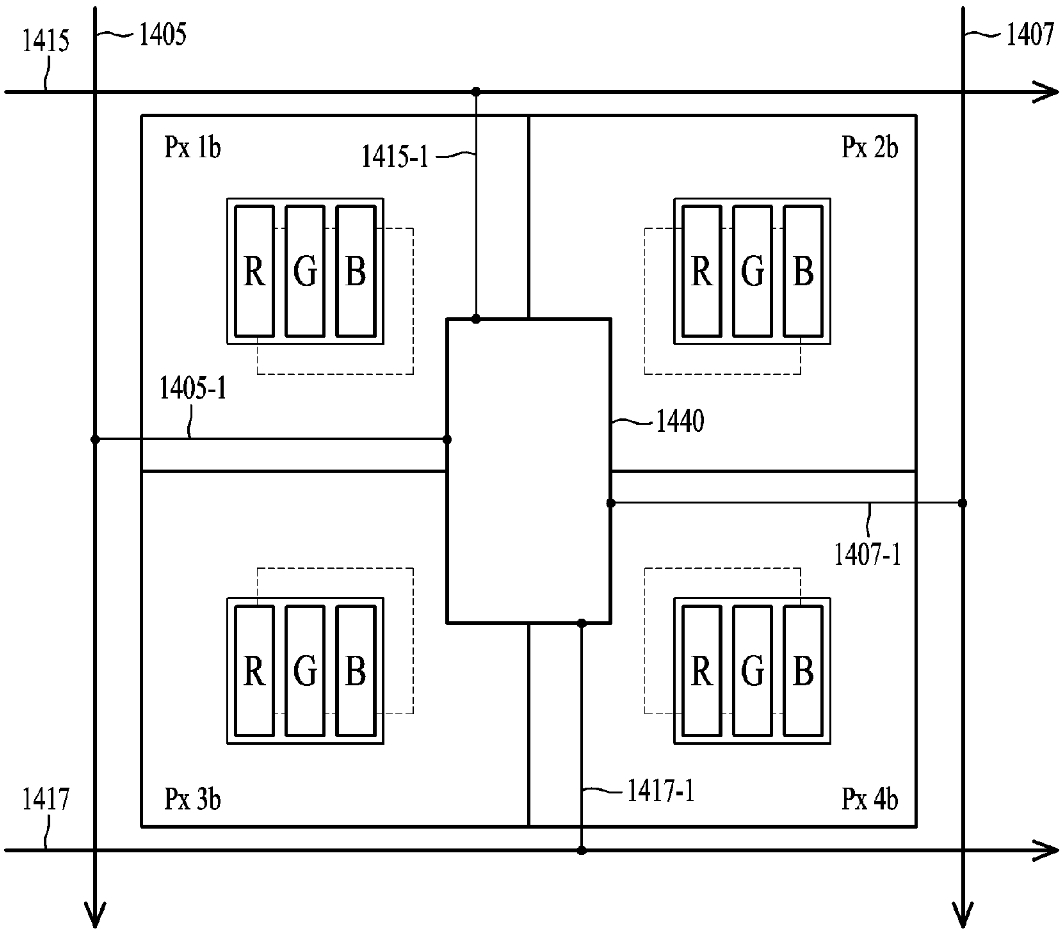

【FIG. 15】
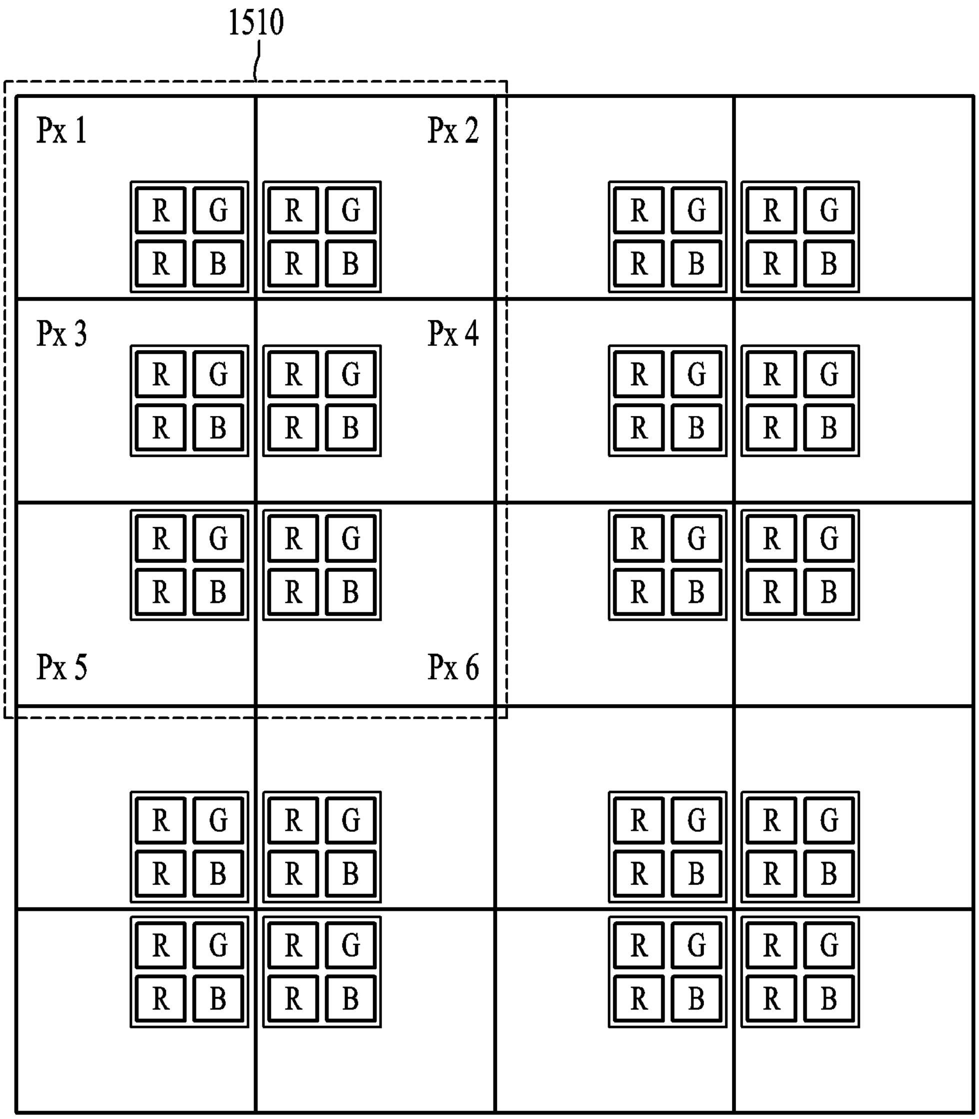

【FIG. 16】
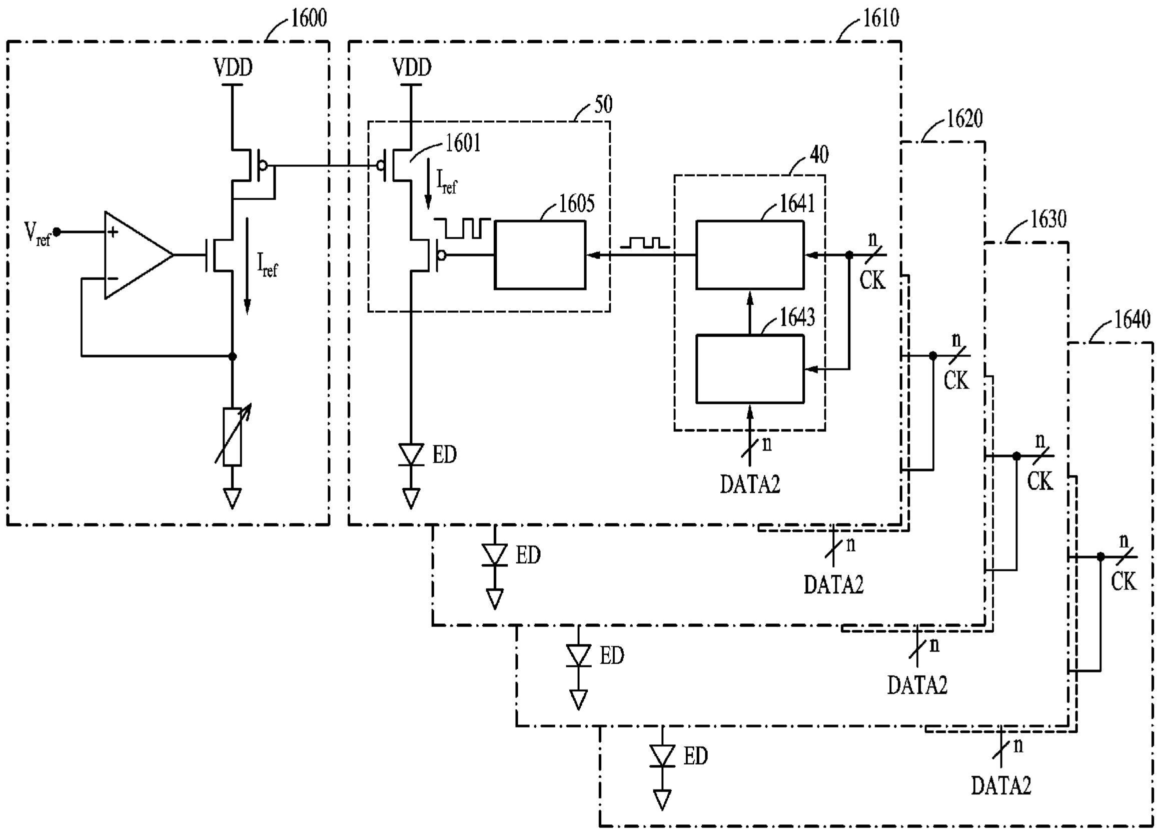

【FIG. 17】
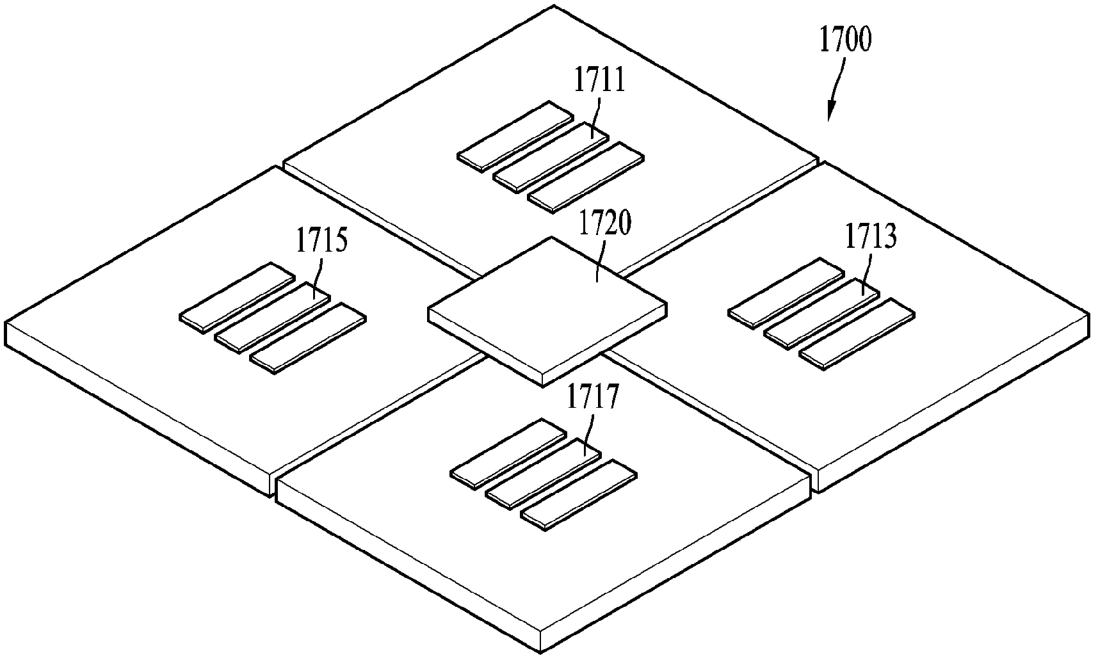

【FIG. 18】
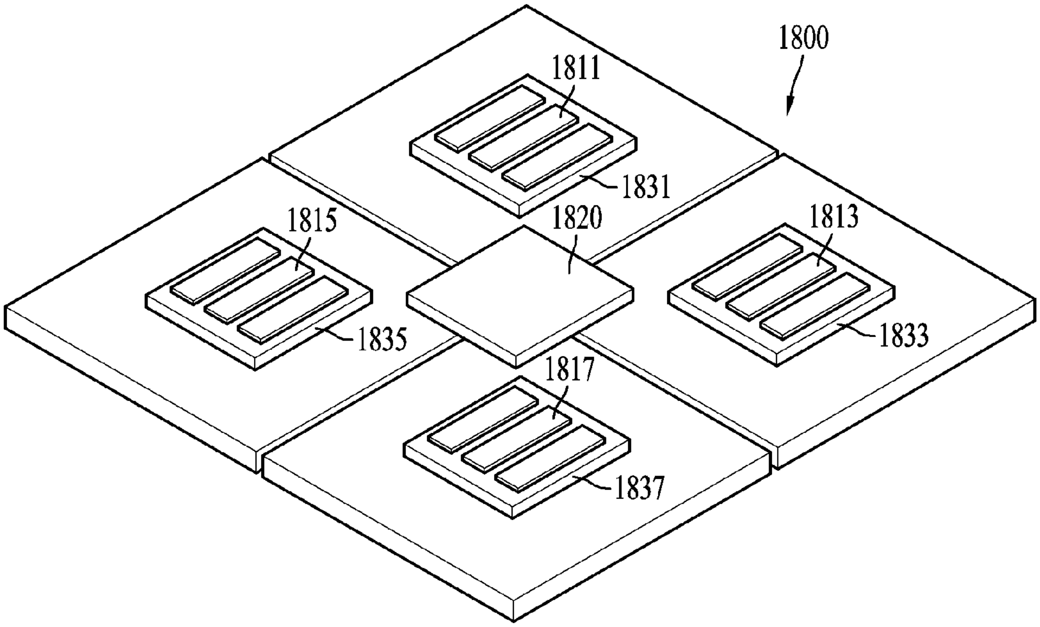

【FIG. 19】
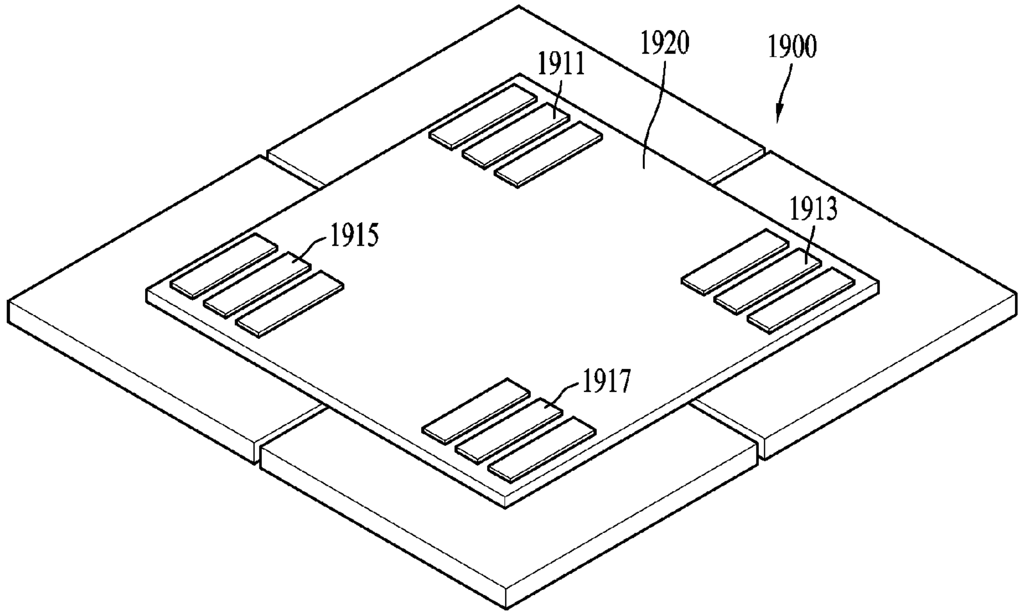

【FIG. 20】
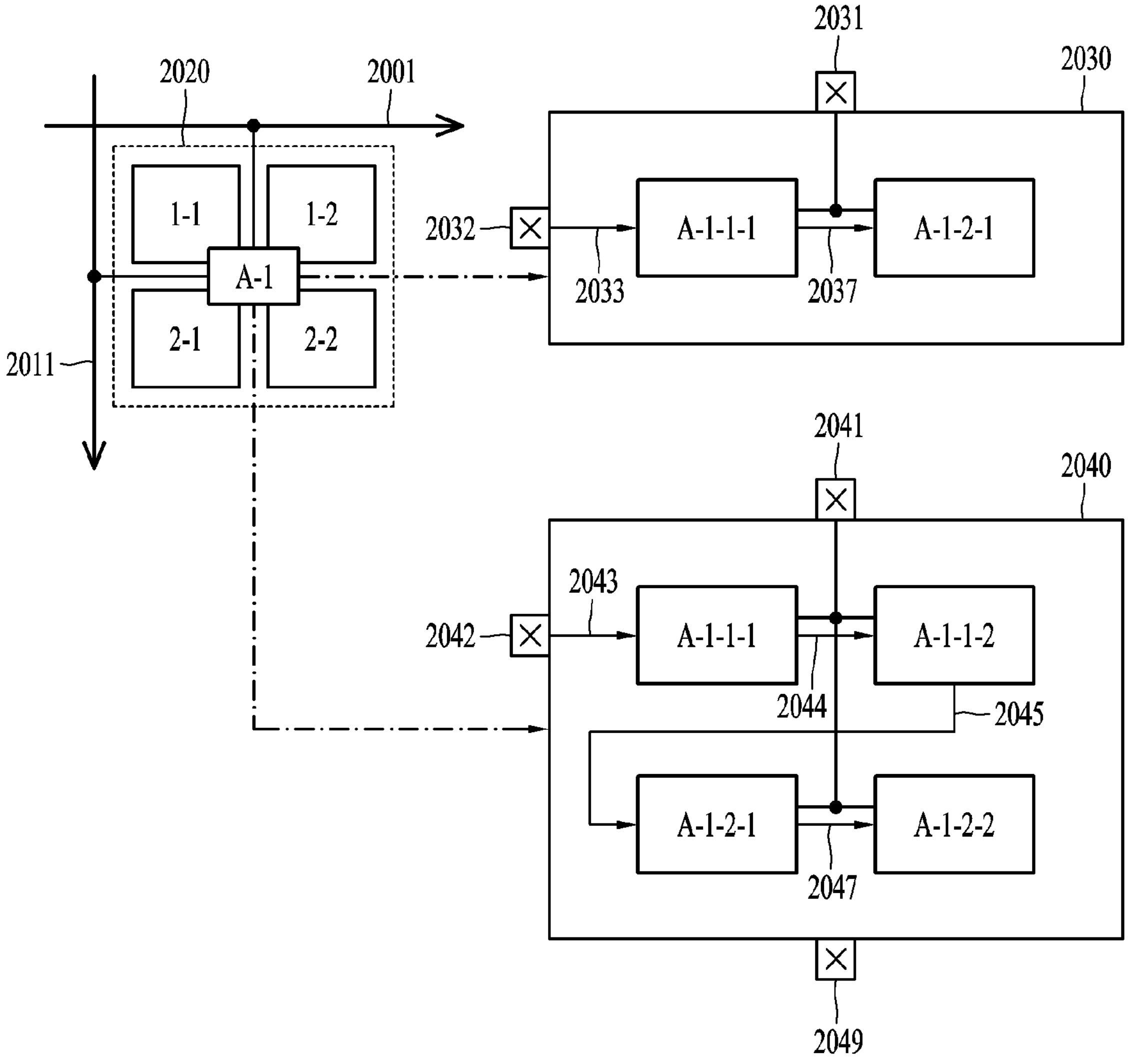

【FIG. 21】
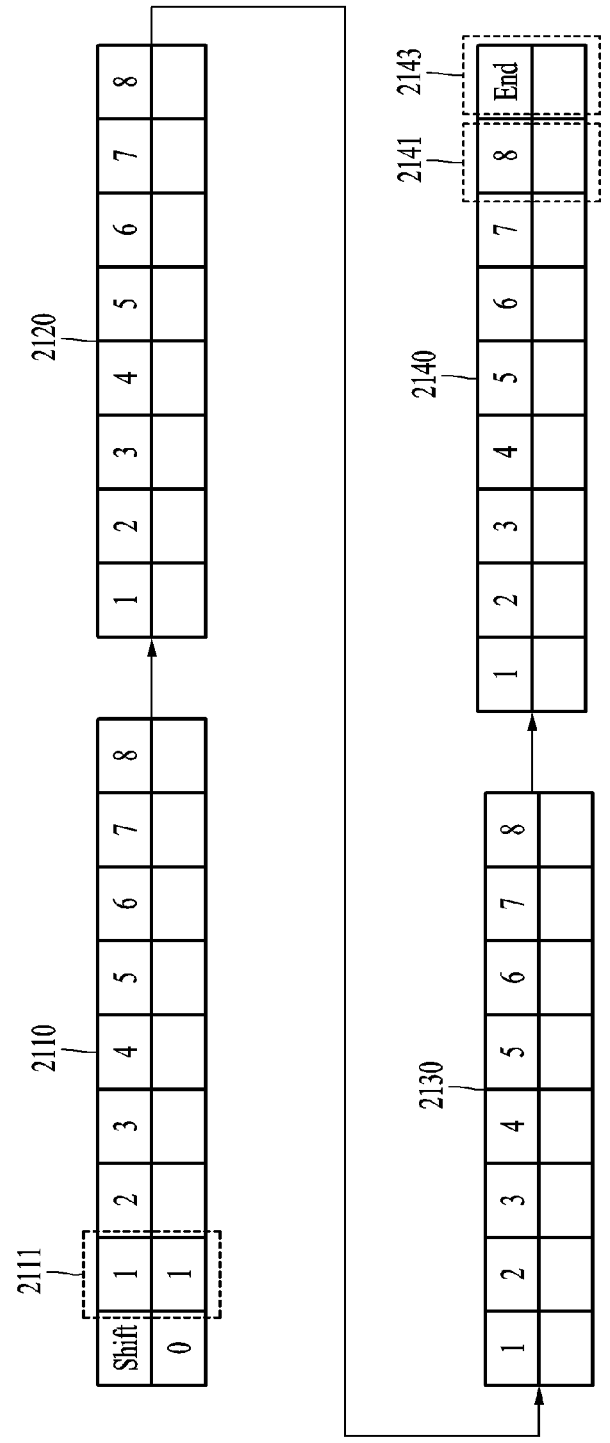

【FIG. 22】
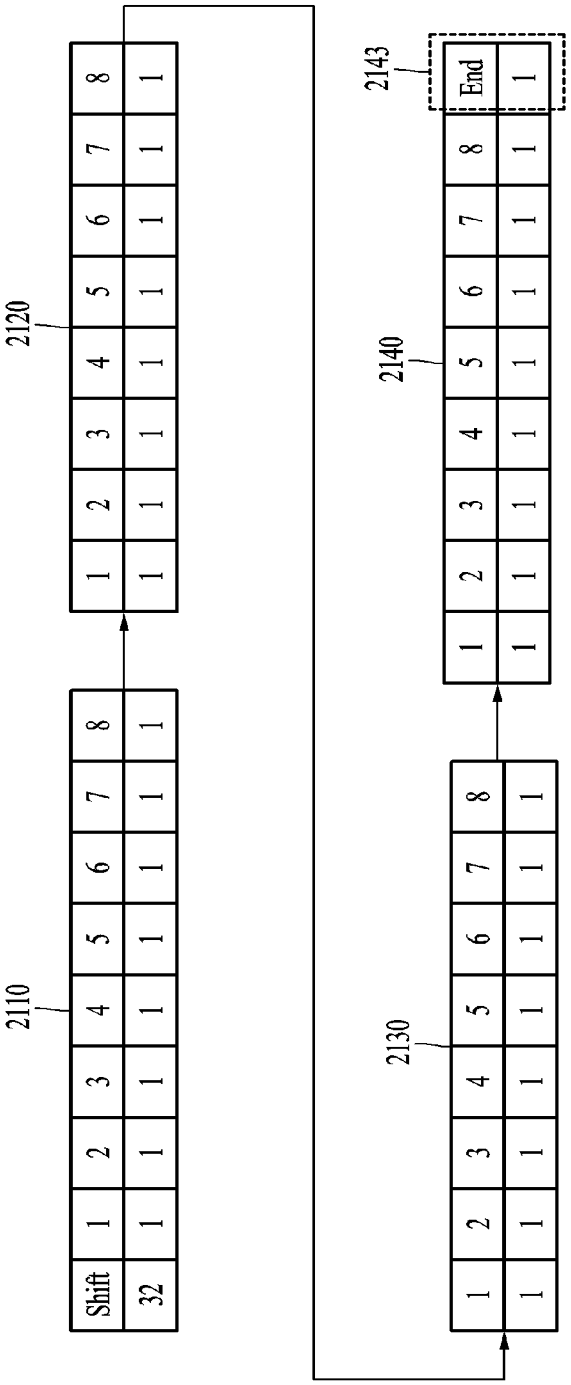

【FIG. 23】
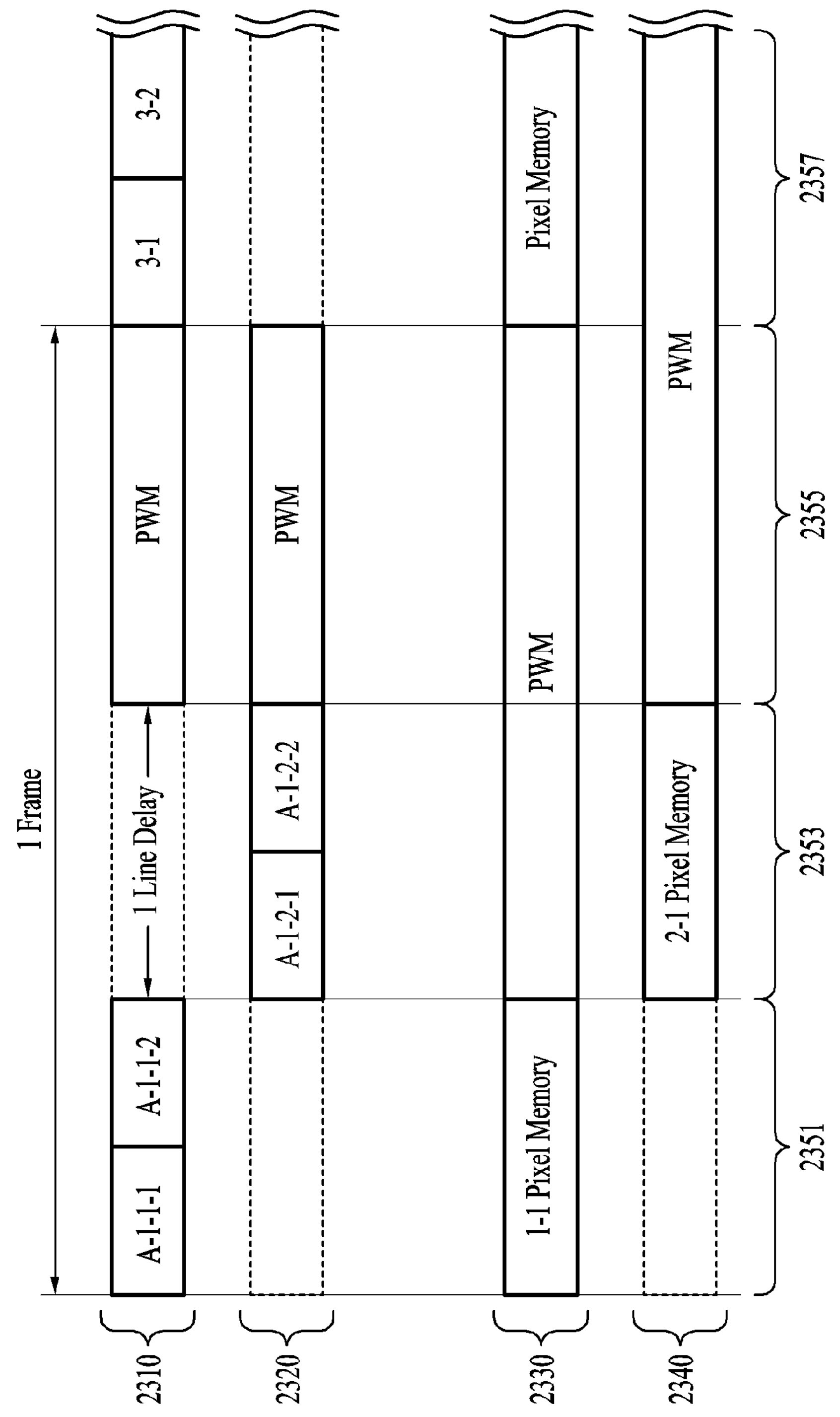

【FIG. 24】
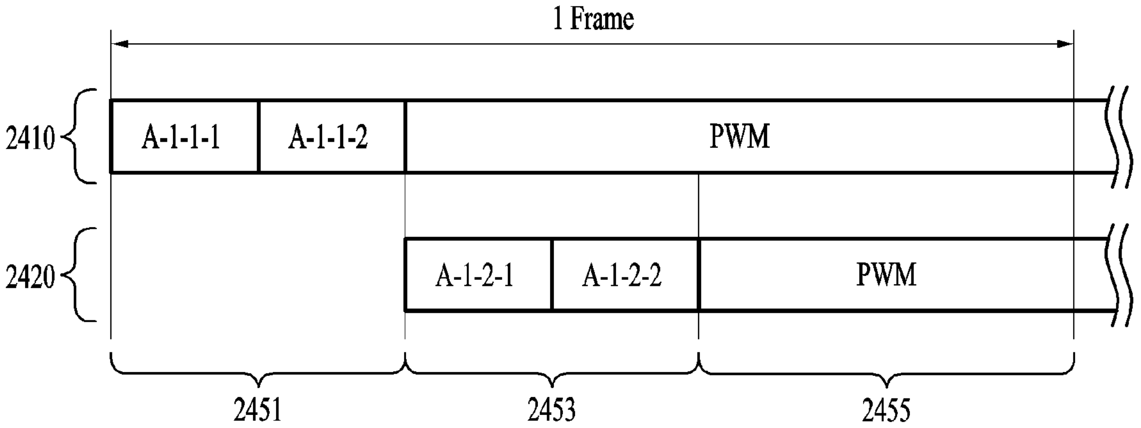

【FIG. 25】
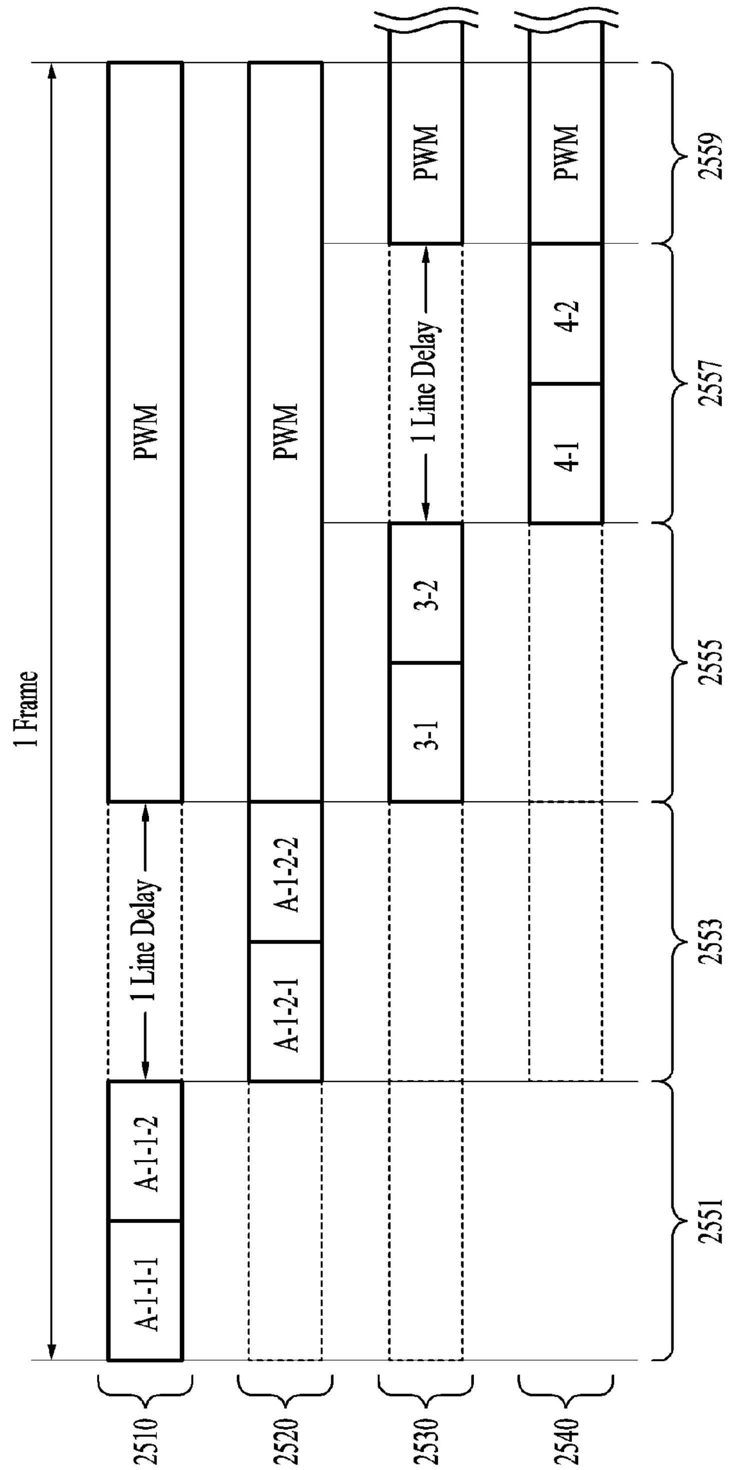

CLUSTER PIXEL CIRCUIT AND DIGITAL DISPLAY SYSTEM

CROSS-REFERENCE TO RELATED APPLICATION

This application claims the priority benefit of Korean Patent Application No. 10-2022-0100516, filed on Aug. 11, 2022, Korean Patent Application No. 10-2022-0136814, filed on Oct. 21, 2022, and Korean Patent Application No. 10-2023-0083279, filed on Jun. 28, 2023, in the Korean Intellectual Property Office, the disclosure of each of which is incorporated herein by reference.

BACKGROUND OF THE DISCLOSURE

Field of the Disclosure

The present disclosure relates to a digital display system, and more particularly to a device including a driving circuit of a display pixel and a display pixel.

Description of the Related Art

Displays using a light-emitting diode (LED) can be applied to various fields from small mobile devices to large outdoor display devices. In particular, displays are being used in more diverse fields such as various devices in vehicles and Augmented Reality (AR) and Virtual Reality (VR) devices.

Therefore, improvements in various characteristics such as various regions, various shapes, high resolution, processing time, manufacturing cost, high reliability and fast response speed are still required.

In addition, improvement in various characteristics of a driving circuit for driving a display is still required.

SUMMARY OF THE DISCLOSURE

Therefore, the present disclosure has been made in view of the above problems, and it is an object of the present disclosure to provide a digital display system with improved various characteristics.

In accordance with an aspect of the present disclosure, the above and other objects can be accomplished by the provision of a cluster pixel circuit for driving a pixel cluster including at least two pixels, the cluster pixel circuit including: a row terminal connected to a row line for receiving PWM (Pulse Width Modulation) clock signal, a column terminal connected to a column line for receiving N-bit data, a first individual pixel driver for driving a first pixel in the cluster pixel, and a second individual pixel driver connected to the first individual pixel driver and for driving a second pixel in the cluster pixel.

The PWM clock signal is commonly inputted to the first individual pixel driver and the second individual pixel driver, and the N-bit data is sequentially inputted to the first individual pixel driver.

Each of the plural individual pixel elements may include a pixel internal memory configured to store video data that is input through the column terminal.

N-bit data input through the column terminal may be shifted from a pixel internal memory of the first individual pixel element to a pixel internal memory of the second individual pixel element at a first line time.

The first individual pixel element and the second individual pixel element may enable a Pulse Width Modulation (PWM) signal input through the row terminal after a preset time delay.

A third individual pixel element connected in series with the second individual pixel element may receive the N-bit data at the second line time and shift it to a pixel internal memory of the fourth individual pixel element.

The third individual pixel element and the fourth individual pixel element may enable a PWM signal input through the row terminal when a data shift operation of a pixel internal memory of the fourth individual pixel element is completed.

In accordance with another aspect of the present disclosure, there is provided a digital display device, including: a pixel cluster including a first pixel and a second pixel; a first contact point for receiving a PWM driving signal; a second contact point for receiving graduation data of the pixels; and a pixel driver for driving light emitters of the first and second pixels included in the pixel cluster based on a signal that is input through the first contact point and second contact point.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a drawing for explaining a display pixel arrangement structure according to an embodiment;

FIG. 2 is a drawing for explaining the display pixel structure of FIG. 1;

FIG. 3 is a drawing for explaining an embodiment of an arrangement structure of a display pixel and pixel-driving circuit according to a related technology;

FIGS. 4A and 4B are drawings for explaining another embodiment of an arrangement structure of a display pixel and pixel-driving circuit according to a related technology;

FIG. 5 is a drawing for explaining the structure of a display driving circuit according to a related technology;

FIG. 6 is a drawing for explaining a common interface-based display device according to an embodiment of the present disclosure;

FIG. 7 illustrates a block diagram of a display pixel driver according to an embodiment of the present disclosure;

FIG. 8 is a drawing for explaining macro pixel driving according to an embodiment of the present disclosure;

FIG. 9 is a drawing for explaining a macro pixel driving according to another embodiment of the present disclosure;

FIG. 10 is a drawing for explaining a macro pixel driving according to still another embodiment of the present disclosure;

FIG. 11 is a drawing for explaining a display driving circuit according to an embodiment of the present disclosure;

FIG. 12 is a drawing for explaining an embodiment of a display array configuration according to a related technology;

FIGS. 13A and 13B are drawings for explaining an embodiment of a display array configuration according to an embodiment of the present disclosure;

FIG. 14 is a drawing for explaining macro pixel driving applicable to the display array configuration of FIG. 13B;

FIG. 15 is a drawing for explaining another example of the display array configuration according to an embodiment of the present disclosure;

FIG. 16 is a drawing for explaining the concept of display pixel current driving according to an embodiment of the present disclosure;

FIGS. 17 to 19 are drawings for explaining embodiments of arrangement structures including a display pixel and a pixel driver according to embodiments of the present disclosure;

FIG. 20 is a drawing for explaining a macro pixel and a pixel driver according to an embodiment;

FIG. 21 is a drawing for explaining a schematic structure of a pixel internal memory for driving a macro pixel according to an embodiment;

FIG. 22 is a drawing for explaining an operation method of the pixel internal memory shown in FIG. 21;

FIG. 23 is a drawing for explaining a write operation and read operation of a pixel internal memory for driving a macro pixel according to an embodiment;

FIG. 24 illustrates another embodiment for explaining a write operation and read operation of a pixel internal memory for driving a macro pixel according to an embodiment; and FIG. 25 is a drawing for explaining a write operation and read operation of a pixel internal memory for two macro pixels according to an embodiment.

DETAILED DESCRIPTION OF THE DISCLOSURE

The present disclosure will now be described more fully with reference to the accompanying drawings and contents disclosed in the drawings. However, the present disclosure should not be construed as limited to the exemplary embodiments described herein.

The terms used in the present specification are used to explain a specific exemplary embodiment and not to limit the present inventive concept. Thus, the expression of singularity in the present specification includes the expression of plurality unless clearly specified otherwise in context. It will be further understood that the terms "comprise" and/or "comprising", when used in this specification, specify the presence of stated components, steps, operations, and/or elements, but do not preclude the presence or addition of one or more other components, steps, operations, and/or elements thereof.

It should not be understood that arbitrary aspects or designs disclosed in "embodiments", "examples", "aspects", etc. used in the specification are more satisfactory or advantageous than other aspects or designs.

In addition, the expression "or" means "inclusive or" rather than "exclusive or." That is, unless otherwise mentioned or clearly inferred from context, the expression "x uses a or b" means any one of natural inclusive permutations.

In addition, as used in the description of the disclosure and the appended claims, the singular forms "a", "an" and "the" are intended to include the plural forms as well, unless context clearly indicates otherwise.

Meanwhile, terms such as "first" and "second" used in this specification and the appending claims are merely used to describe a variety of constituent elements, but the constituent elements are not limited by the terms. The terms are used only for the purpose of distinguishing one constituent element from another constituent element.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Meanwhile, in the following description of the present disclosure, a detailed description of known functions and configurations incorporated herein will be omitted when it may make the subject matter of the present disclosure unclear. The terms used in the specification are defined in consideration of functions used in the present disclosure, and can be changed according to the intent or conventionally used methods of clients, operators, and users. Accordingly, definitions of the terms should be understood on the basis of the entire description of the present specification.

FIG. 1 is a drawing for explaining a display pixel arrangement structure according to an embodiment.

Referring to FIG. 1, the display panel 100 includes a plurality of display pixels Px disposed or arranged in the form of a matrix M×N (where M and N are integers). Here, display pixels Pxs disposed in M rows and N columns may be referred to as an "array of pixels."

Accordingly, the array of pixels includes pixels disposed in M rows and N columns.

M rows may be referred to as "row lines," and N columns may be referred to as "column lines."

Here, the row lines may be called horizontal lines, scan lines, or gate lines, and the column lines may be called vertical lines or data lines.

Terms such as row lines, column lines, horizontal lines, and vertical lines may be used to refer to lines formed by pixels on a pixel array, and the terms such as scan lines, gate lines, and data lines may be used to refer to actual wiring on the display panel 100 through which data or signals are transmitted.

Each display pixel (Px) may include a plurality of light-emitting elements. Here, the plural light emitters may be inorganic light emitters.

Although not shown in FIG. 1, the display panel 100 may include a pixel driver provided for each display pixel (Px).

FIG. 2 is a drawing for explaining the display pixel structure of FIG. 1.

Referring to FIG. 2, a display pixel 200 includes a sub-pixel region 205 in which a plurality of light-emitting elements are disposed. Here, the sub-pixel region 205 may also be referred to as "active" region.

In the display pixel 200, a part 201 excluding the sub-pixel region 205 may be referred to as a "non-active region" or "a black region."

The plural light-emitting elements may include three types of subpixels such as a red R subpixel, a green G subpixel and a blue B subpixel. In other words, each of the plural light-emitting elements may be referred to as a sub-pixel. Here, the number of red R sub-pixels may be one or two. The type and number of subpixels disposed in one display pixel may be variously combined.

A fill factor for an array of display pixels may be determined according to the area of the sub-pixel area 205 in the display pixel 200.

Here, the fill factor may be determined based on size design conditions of a pixel region of a display substrate and a sub-pixel region in which a plurality of light emitters are disposed.

For example, when the pitch of the display pixel 200 is 0.1 [mm], the display panel 100 may be expressed as a "0.1 mm-pitch display panel." Here, the total surface region of the display pixel 200 is 0.01 [$mm^2$]. Red, green, and blue may be implemented by each light-emitting element, and the size of each light-emitting element may be 0.0016 [$mm^2$]. In this case, since there is a case where only one light-emitting element chip emits light in a general display operation, the minimum fill factor F=0.16 (1.6/10). Meanwhile, the fill factor may be determined in consideration of the entire area of the sub-pixel region 205, and when the total area of the sub-pixel region 205 is 0.0048 [[$mm^2$], the fill factor F is 0.48.

FIG. 3 is a drawing for explaining an embodiment of an arrangement structure of a display pixel and pixel-driving circuit according to a related technology.

Referring to FIG. 3, the display pixel 200 may include a display pixel-driving circuit region 310.

The display pixel-driving circuit region 310 may be a semiconductor wafer for forming a display pixel-driving circuit and may be, for example, a silicon semiconductor wafer.

The display pixel-driving circuit may be connected to a light-emitting element disposed in a sub-pixel region 205 through electrical wire 301.

FIGS. 4A and 4B are drawings for explaining another embodiment of an arrangement structure of a display pixel and pixel-driving circuit according to a related technology.

Referring to FIG. 4A, a display pixel 401 illustrates an embodiment wherein a region where light-emitting elements 410 are disposed and a region 420 where a pixel driver is formed are formed on the same layer.

A display pixel 401 of FIG. 4B illustrates another embodiment wherein a region in which light-emitting elements 410 are disposed and a region 420 in which a pixel driver is formed are formed on different layers.

For example, the region 420 where a pixel driver is formed may be a Thin Film Transistor (TFT) layer under a light-emitting element. Here, the pixel-driving circuit may exist for each light-emitting element corresponding to the TFT layer.

For convenience of explanation, the illustration of electrical wiring for connecting the pixel-driving circuit and the light-emitting element is omitted in FIGS. 4A and 4B.

FIG. 5 is a drawing for explaining the structure of a display driving circuit according to a related technology.

Referring to FIG. 5, the display driving circuit includes a row driver 510, a column driver 520 and a pixel driver provided for each display pixel.

Each pixel driver may provide a driving current to a light-emitting element of a display pixel based on a video data voltage applied from the column driver 520. Here, the video data voltage may include a constant current generator data voltage and a Pulse Width Modulation (PWM) data voltage.

Each pixel driver may express (gradation expression or tone-expression) a gradation of an image by providing a driving current, which has a magnitude corresponding to the constant current generator data voltage, to the light emitter for a time corresponding to the PWM data voltage.

The embodiment shown in FIG. 5 may be applied to an array of display pixels disposed in a 4×5 shape. Accordingly, first to fifth column lines are required to supply a column signal to 20 display pixels. In addition, four row lines are required to provide a low signal to 20 display pixels.

The column lines and row lines corresponding to the display pixel may be factors of increasing electrical wiring and factors of increasing cost in the manufacturing process.

FIG. 6 is a drawing for explaining a common interface-based display device according to an embodiment of the present disclosure.

Referring to FIG. 6, the common interface-based display device according to an embodiment includes display pixels disposed on M rows and N columns. Here, each of the display pixels is marked in the format of "row number-column number," where M is 4 and N is 5.

For the convenience of description and comparison with related art, a 4×6 format is illustrated. However, it is natural that the number of display pixels can be expanded without specific limitations.

In the embodiment of the present disclosure, the concepts of "macro pixel" and "common interface" are introduced to improve an increase in electrical wiring, the complexity of a device, and the like.

In this specification, a macro pixel means a display pixel group consisting of a plurality of adjacent display pixels. For example, a macro pixel may be a display pixel group consisting of m×n (where m is an integer smaller than M, n is an integer smaller than N) display pixels. The macro pixel may also be referred to as a "pixel cluster" or a "group of adjacent pixels" according to the definition of the term.

In this specification, the term "common interface" means an element that shares a column line or column terminal for a macro pixel.

The concepts of "macro pixel" and "common interface" will become clearer through the following explanations.

In the embodiment shown in FIG. 6, the values of m and n are 2 respectively. In addition, adjacent m×n display pixels may also be referred to as "adjacent 2L (where L is an integer) display pixels." In the embodiment shown in FIG. 6, the value of L is 2.

Accordingly, the M×N display pixels shown in FIG. 6 may be divided into a plurality of macro pixels composed of m×n display pixels.

For example, a first macro pixel 620 may be referred to as a pixel group consisting of display pixels 1-1, 1-2, 2-1 and 2-2.

The common interface-based display device according to an embodiment includes a plurality of pixel drivers for driving display pixels. Here, the plural pixel drivers mean "common interface-based pixel drivers." For example, the reference numeral "A-1" in FIG. 6 is a common interface-based pixel driver to drive the first macro pixel 620.

Hereinafter, the "common interface-based pixel driver" may simply be referred to as 'a cluster pixel circuit' or 'a pixel driver'.

A pixel driver A-1 may distribute signals, which are input through a first column line 601, to 2×2 display pixels 1-1, 1-2, 2-1 and 2-2 in a first macro pixel 620.

The pixel driver A-1 may distribute signals, which are input through a first row line 611, to 2×2 display pixels 1-1, 1-2, 2-1 and 2-2 in the first macro pixel 620.

A pixel driver A-2 may perform the same operation as the pixel driver A-1. Accordingly, the pixel driver A-2 may distribute signals, which are input through a second column line 603, to display pixels 1-3, 1-4, 2-3 and 2-4 in a macro pixel.

In addition, the pixel driver A-2 may distribute signals, which are input through a first row line 611, to display pixels 1-3, 1-4, 2-3 and 2-4 in the macro pixel.

A pixel driver B-1 may distribute signals, which are input through the first column line 601, to display pixel 3-1, 3-2, 4-1 and 4-2 in the macro pixel.

The pixel driver B-1 may distribute signals, which are input through a second row line 613, to display pixels 3-1, 3-2, 4-1 and 4-2 in the macro pixel A pixel driver B-2 may distribute signals, which are input through the second column line 603, to display pixels 3-3, 3-4, 4-3 and 4-4 in the macro pixel.

The pixel driver B-2 may distribute signals, which are input through the second row line 613, to display pixels 3-3, 3-4, 4-3 and 4-4 in the macro pixel.

A pixel driver A-3 may distribute signals, which are input through a third column line 605, to display pixels 1-5, 1-6, 2-5 and 2-6 in the macro pixel.

The pixel driver A-3 may distribute signals, which are input through a first row line 611, to display pixels 1-5, 1-6, 2-5 and 2-6 in the macro pixel.

The pixel driver B-3 may operate similarly to the pixel driver A-3.

The common interface-based pixel drivers A-1 to B-3 may include a common element that shares at least one of the column lines of the column driver and the row lines of the row driver for m×n display pixels in the macro pixel.

A specific example of "common device" will be explained with reference to FIG. 7.

The number of column lines may be reduced by applying a macro pixel and a common interface. In addition, the number of row lines may be reduced by applying a macro pixel and a common interface.

FIG. 7 illustrates a block diagram of a display pixel driver according to an embodiment of the present disclosure.

Referring to FIG. 7, a pixel driver 700 includes a common element 710, a plurality of terminals 761, 763, 765 and 767 and individual pixel elements 720, 730, 740 and 750.

The common element 710 shares at least one of the column lines of the column driver and the row lines of the row driver for display pixels in the macro pixel.

The display pixels in the macro pixel may share at least one of the column lines and the row lines through the common element 710.

For example, the common element 710 may be a component of the pixel driver A-1 shown in FIG. 6. Here, the common element 710 shares the first column line 601 and the first row line 611 for display pixels 1-1, 1-2, 2-1 and 2-2 in the first macro pixel 620.

The common element 710 may be connected to a row line of the row driver through a row terminal 761 and may be connected to a column line of the column driver through a column terminal 763. In addition, the common element 710 may receive power through a VCC terminal 765 and a GND terminal 767.

Here, the expression "share a column line for display pixels" can also be expressed as "share a column terminal for display pixels." Accordingly, the common element 710 may share at least one of the row terminal 761 and the column terminal 763 for the display pixels in the macro pixel.

The common element 710 may include a power generator 711 for generating a required power of a pixel driver, a low signal distributor 713 and a column signal distributor 715. In addition, the common element 710 may further include a resetter (not shown).

The resetter may generate a reset signal for initializing a pixel internal memory included in each of the individual pixel elements 720, 730, 740 and 750. Here, the resetter may initialize a pixel internal memory part based on a low signal and a column signal in a preset video data reset period.

The power generator 711 may generate a reference voltage (VDD) using a low signal that is input from the row terminal 761 and a column signal that is input from the column terminal 763. The reference voltage can be output to each of the individual pixel elements 720, 730, 740 and 750.

In FIG. 7, two thick lines between the common element 710 and each of the individual pixel elements 720, 730, 740 and 750 represent electrical wiring that delivers a reference voltage and a reset signal.

A region where the pixel driver 700 disposes may be determined as a specific location in the macro pixel in consideration of a process of manufacturing electrical wiring between the common element 710 and each of the individual pixel elements 720, 730, 740 and 750, a process of transferring (or picking and placing) the light-emitting element, the crack of a glass substrate that can be included in a display panel, the bonding of a TFT layer, etc. For example, the region, i.e., "pixel driver region," in which the pixel driver 700 is disposed may be formed to overlap a plurality of non-active regions of the macro pixel.

The column signal distributor 715 distributes the signal input through the column terminal 763 to the individual pixel elements 720, 730, 740 and 750.

The signal input through the column terminal 763 may be video data stored in a pixel internal memory part of each of the individual pixel elements 720, 730, 740 and 750.

Here, the video data may be four digital data for a display pixel which respectively corresponds to the individual pixel elements 720, 730, 740 and 750.

Accordingly, four digital data may be input at once through the column terminal 763, and the column signal distributor 715 may distribute four digital data to each of the individual pixel elements 720, 730, 740 and 750 based on addressing data or a code command included in an input signal.

The low signal distributor 713 distributes the signal input through the row terminal 761 to the individual pixel elements 720, 730, 740 and 750.

The signal input through the row terminal 761 may be a PWM driving signal for PWM driving of each of the individual pixel elements 720, 730, 740 and 750.

When a PWM driving signal is input at once through the row terminal 761, the low signal distributor 713 may distribute a PWM driving signal to each of the individual pixel elements 720, 730, 740 and 750 based on addressing data or a code command included in the input signal.

Here, the low signal distributor 713 may distribute a timing signal for controlling the driving time of each of the macro pixel display pixels to each of the individual pixel elements 720, 730, 740 and 750.

In FIG. 7, two lines expressed as thin lines between the low signal distributor 713 and the individual pixel elements 720, 730, 740 and 750 represent electrical wiring for distribution of a low signal. In addition, two lines expressed as thin lines between the column signal distributor 715 and the individual pixel elements 720, 730, 740 and 750 represent electrical wiring for the distribution of a column signal.

Each of the individual pixel elements 720, 730, 740 and 750 is connected to the common element 710 and drives a plurality of light emitters respectively included in the display pixels in the macro pixel.

Each of the individual pixel elements 720, 730, 740 and 750 may include a pixel internal memory for storing video data that is input through the column signal distributor 715.

Each of the individual pixel elements 720, 730, 740 and 750 may include a pixel driver that controls driving of a plurality of light emitters based on video data and a PWM driving signal.

Each of the individual pixel elements 720, 730, 740 and 750 may include a plurality of terminals or electrodes connected to the light-emitting elements. For example, each of the individual pixel elements 720, 730, 740 and 750 may include R, G, and B electrodes connected to the light-emitting element.

In FIG. 7, reference numerals 765 and 767 indicate a voltage input terminal and ground terminal which can be additionally provided to a pixel driver.

The embodiment shown in FIG. 7 shows an example of distributing signals input through the row terminal 761 and the column terminal 763 to the individual pixel elements 720, 730, 740 and 750. Signals that are input through the row terminal 761 and the column terminal 763 may be processed differently from the embodiment shown in FIG. 7. This will be described with reference to FIG. 20 below.

Meanwhile, the common interface for driving the display pixels in the macro pixel may be designed considering the fill factor. In addition, the common interface may be designed considering the application type of the pixel driver.

Accordingly, the number of column terminals and row terminals shared for the macro pixel may be determined based on at least one of the fill factor and the application type of the pixel driver.

The application type of the pixel driver may be divided into a large-area display, a monitor display and a mobile display.

Here, the fill factor may be determined to have a small value in the order of a large-area display, a monitor display and a mobile display.

For example, a display for a television and a large display for outdoor installation may be a large-area display. Here, the large-area display may be designed to have a fill factor (0.1-0.3) of 10 to 30%.

For example, a monitor for a computer, a display for a vehicle, and a display for a pad device may be a monitor display. Here, the monitor display may be designed to have a fill factor (0.3 to 0.5) of 30-50%.

For example, a display for a mobile smartphone or a wearable device may be a mobile display. Here, the mobile display may be designed to have a fill factor (0.5 to 0.9) of 50 to 90%.

Hereinafter, various embodiments of a common interface design for driving a macro pixel will be described with reference to FIGS. 8 to 10.

FIG. 8 is a drawing for explaining macro pixel driving according to an embodiment of the present disclosure.

The embodiment shown in FIG. 8 may be applied to a large-area display.

Referring to FIG. 8, a macro pixel is composed of four display pixels Px1, Px2, Px3, Px4.

In this case, at least eight contact points for receiving signals from column and row lines except for VCC and GND are required to PWM-drive the four pixels Px1, Px2, Px3, and Px4 according to a related technology. However, this embodiment has a feature that contact points can be reduced to six contact points by configuring the contact points for receiving signals from the column lines to be shared by two pixels. Here, the six contact points refer to contact points where wires 801-1, 803-1, 811-1, 811-2, 813-1 and 813-2 and the pixel driver 820 are connected.

One pixel driver for driving a macro pixel may include one common element and four individual pixel elements for PWM-driving individual pixels Px1, Px2, Px3 and Px4.

The pixels Px1 and Px3 may share the column line 801 through the electrical wire 801-1. The pixels Px2 and Px4 may share a column line 803 through the electrical wire 803-1.

Accordingly, the pixel driver 820 may include a distributor for distributing each column line signal.

The embodiment shown in FIG. 8 illustrates a structure wherein row lines are not shared in a macro pixel. In the case of a large-area display, it may be desirable not to share row lines in consideration of efficient PWM driving and power distribution.

Accordingly, the pixel driver 820 may not include a distributor for distributing each row line signal.

The pixel driver 820 may receive a low signal that is input from the row line 811 through the electrical wire 811-1. Here, the low signal that is input through the electrical wire 811-1 is a signal to drive Px1.

The pixel driver 820 may receive a low signal, which is input from the row line 811, through the electrical wire 811-2. Here, the low signal input through the electrical wire 811-2 is a signal to drive Px2.

The pixel driver 820 may receive a low signal, which is input from a row line 813, through the electrical wire 813-1. Here, the low signal input through the electrical wire 813-1 is a signal to drive Px3.

The pixel driver 820 may receive a low signal, which is input from the row line 813, through the electrical wire 813-2. Here, the low signal input through the electrical wire 813-2 is a signal to drive the Px4.

FIG. 9 is a drawing for explaining a macro pixel driving according to another embodiment of the present disclosure.

The embodiment shown in FIG. 9 may be applied to a large-area display.

Referring to FIG. 9, a macro pixel is composed of four display pixels Px1, Px2, Px3, Px4.

In this case, at least eight contact points for receiving signals from column and row lines except for VCC and GND are required to PWM-drive four pixels Px1, Px2, Px3, and Px4 according to a related technology. However, this embodiment has a feature that contact points can be reduced to four contact points by configuring the contact points for receiving signals from the column and low lines to be shared by two pixels. Here, the four contact points refer to contact points where wires 901-1, 903-1, 911-1 and 913-1 and a pixel driver 920 are connected.

One pixel driver for driving a macro pixel may include one common element and four individual pixel elements for PWM-driving individual pixels Px1, Px2, Px3 and Px4.

The pixel driver 920 may include one common element or two common elements. The pixel driver 920 may include four individual pixel elements.

The pixels Px1 and Px3 may share a column line 901 through the electrical wire 901-1. The pixels Px2 and Px4 may share a column line 903 through the electrical wire 903-1.

The pixel driver 920 may include a distributor for distributing each column line signal.

Unlike the embodiment of FIG. 8, the embodiment shown in FIG. 9 may share row lines as well as column lines.

The pixel driver 920 may receive a low signal, which is input from a row line 911, through the electrical wire 911-1. Here, the low signal that is input through the electrical wire 911-1 is a signal to drive Px1 and Px1. Alternatively, the low signal that is input through the electrical wire 911-1 may be a signal for driving Px1 and Px3.

The pixel driver 920 may receive a low signal, which is inputted from a row line 913, through the electrical wire 913-1. Here, the low signal that is input through the electrical wire 913-1 is a signal for driving Px3 and Px4. Alternatively, the low signal that is input through the electrical wire 913-1 may be a signal for driving Px2 and Px4.

FIG. 10 is a drawing for explaining a macro pixel driving according to still another embodiment of the present disclosure.

The embodiment shown in FIG. 10 may be applied to a large-area display or a mobile display.

Referring to FIG. 10, a macro pixel is composed of four display pixels Px1, Px2, Px3, Px4.

In this case, at least eight contact points for receiving signals from column and row lines except for VCC and GND are required to PWM-drive four pixels Px1, Px2, Px3, and Px4 according to a related technology. However, this embodiment has a feature that contact points can be reduced to two contact points by configuring all the contact points for receiving signals from the column and low lines to be shared by four pixels. Here, the two contact points refer to contact points where wires 1001-1 and 1011-1 and a pixel driver 1020 are connected.

One pixel driver for driving a macro pixel may include one common element and four individual pixel elements for PWM-driving individual pixels Px1, Px2, Px3 and Px4.

The pixel driver 1020 may include one common element and four individual pixel elements.

The pixels Px1, Px2, Px3 and Px4 may share a column line 1001 through the electrical wire 1001-1.

A pixel driver 1020 may include a distributor for distributing column line signals.

The pixels Px1, Px2, Px3 and Px4 may share a row line 1011 through the electrical wire 1011-1.

The pixel driver 1020 may include a distributor for distributing row line signals.

In FIG. 10, a column line 1003 may supply a column signal to a next macro pixel. In addition, a row line 1013 may supply a low signal to another macro pixel.

FIG. 11 is a drawing for explaining a display driving circuit according to an embodiment of the present disclosure.

A macro pixel and common interface applied to FIG. 11 may include the embodiments described with reference to FIGS. 6, 7 and 10.

In the case of the display driving circuit according to an embodiment of the present disclosure, column lines and row lines on a display panel are reduced, unlike the display driving circuit according to a related technology shown in FIG. 5.

Here, the number of column lines 1121, 1123 and 1125 and row lines 1111 and 1113 on the display panel may be determined based on Equation 1 below:

$$\begin{cases} \mathrm{Row}_N = M/m + R_R,\ R_R = MOD(M, m) \\ Col_N = N/n + R_C,\ R_C = MOD(N, n) \end{cases} \quad \text{[Equation 1]}$$

where $\mathrm{Row}_N$ denotes the number of row lines, $\mathrm{Col}_N$ denotes the number of column lines, and MOD(X, Y) denotes the remainder of X/Y.

Referring to FIG. 11, M is 4, and m is 2. Accordingly, MOD(M, m) is 0, and the total number of column lines is 3.

Referring to FIG. 11, N is 5, and n is 2. Accordingly, MOD(M, n) is 1, and the total number of column lines is 3.

In FIG. 11, addressing data or a code command for distributing column signals to individual pixel elements may be generated by a column driver 1120. In addition, addressing data or a code command may be generated in a separate column addressing part 1130.

To perform the same operation as video data input according to a related technology, the column addressing part 1130 may input to pixel drivers A-1 and B-1 through serial-to-parallel conversion or combination of column signals input from Col1 and Col2.

For example, a signal output from Col1 may be a video data stream input to pixels 1-1, 2-1, 3-1 and 4-1. A signal output from Col2 may be a video data stream input to pixels 1-2, 2-2, 3-2 and 4-2.

The column addressing part 1130 may combine column signals input from Col1 and Col2 to convert into sequences corresponding to pixels 1-1, 2-1, 1-2, 2-2, 3-1, 4-1, 3-2 and 4-2.

Here, sequences corresponding to the pixels 1-1, 2-1, 1-2 and 2-2 are input into a pixel driver A-1. Sequences corresponding to the pixels 3-1, 4-1, 3-2 and 4-2 may be input into a pixel driver B-1.

In FIG. 11, addressing data or a code command for distributing low signals to individual pixel elements may be generated in a row driver 1110. In addition, addressing data or a code command may be generated in a separate row addressing part 1140.

For example, a signal output from ROW1 may be a PWM driving signal input to pixels 1-1, 1-2, 1-3, 1-4 and 1-5. A signal output from ROW2 may be a driving signal input to pixels 2-1, 2-2, 2-3, 2-4 and 2-5.

The row addressing part 1140 may combine column signals input from ROW1 and ROW2 to convert to sequences corresponding to pixels 1-1, 1-2, 2-1, 2-2, 1-3, 1-4, 2-3, 2-4, 1-5 and 2-5.

Here, the sequences corresponding to pixels 1-1, 1-2, 2-1 and 2-2 are input to a pixel driver A-1. Sequences corresponding to pixels 1-3, 1-4, 2-3 and 2-4 may be input to a pixel driver B-1. Sequences corresponding to pixels 1-5 and 2-5 may be input to a pixel driver A-3.

The electrical wires may be formed thicker by reducing column lines and row lines formed on a display panel. For example, voltage drop (IR-Drop) may be reduced if the thickness of wires formed on a display panel is increased.

Reduction of lines formed on a display panel can bring advantages of simplifying electrical wiring, improving assemblability, reducing manufacturing costs and reducing complexity.

FIG. 12 is a drawing for explaining an embodiment of a display array configuration according to a related technology.

The introduction of a macro pixel and a common interface may be said to improve the characteristics of a display system from the viewpoint of a display driving circuit. A macro pixel and a common interface may also be applied to a display array configuration according to a related technology. FIGS. 8 to 10 are examples of applying a macro pixel and a common interface to a display array configuration according to a related technology.

Meanwhile, in the case of a micro LED-applied display wherein a plurality of light-emitting elements 1205 are disposed in a display pixel 1200, improvement in characteristics considering a transfer process or a pick and place process may be required.

When the chip size is less than 10 μm, there are difficulties in the transfer process.

FIGS. 13A and 13B are drawings for explaining an embodiment of a display array configuration according to an embodiment of the present disclosure.

Referring to FIG. 13A, m×n display pixels Px1, Px2, Px3 and Px4 in a macro pixel 1310 include sub-pixel regions 1311, 1313, 1315 and 1317 in which a plurality of light emitters are disposed.

The sub-pixel regions 1311, 1313, 1315 and 1317 of the m×n display pixels Px1, Px2, Px3 and Px4 may be formed at the corner or outside of each of the display pixels to be adjacent to each other.

In other words, the sub-pixel regions 1311, 1313, 1315 and 1317 are arranged at the corners or outside of the display pixels so that the adjacent pixels 1311, 1313, 1315 and 1317 can be transferred at once.

At least one macro pixel 1310 among a plurality of macro pixels on the display array may include a first display pixel Px1, a second display pixel Px2 located to the right of the first display pixel Px1, a third display pixel Px3 located under the first display pixel Px1 and a fourth display pixel Px4 located the right of the third display pixel Px3.

Here, at least a portion of the sub-pixel region 1311 of the first display pixel Px1 may be formed (transferred) at a lower right corner of the first display pixel Px1.

At least a portion of the sub-pixel region 1315 of the second display pixel Px2 may be formed (transferred) at a lower left corner of the second display pixel Px2.

At least a portion of the sub-pixel region 1313 of the third display pixel Px3 may be formed at an upper right corner of the third display pixel Px3.

At least a portion of the sub-pixel region 1317 of the fourth display pixel Px4 may be formed at an upper left corner of the fourth display pixel Px4.

The display pixel array structure shown in FIG. 13A may have the same physical dimension and fill factor as a structure according to a related technology.

The entire macro pixel may be transferred at once by dividing adjacent pixels into one macro pixel unit and transferring in a macro pixel unit. Correspondingly, transfer efficiency may be improved.

The transfer method according to the embodiment of the present disclosure has the advantage of increasing transfer efficiency while maintaining a physical size and a fill factor.

Meanwhile, it may be necessary to minimize light interference between display pixels depending on the characteristics of the light emitter. FIG. 13B shows an embodiment of disposing a sub-pixel region to the outside to reduce light interference between display pixels. Here, a barrier may be formed on a cover layer to reduce light interference between display pixels.

Referring to FIG. 13B, each of m×n display pixels Px1*b*, Px2*b*, Px3*b* and Px4*b* in a macro pixel 1330 includes sub-pixel regions 1331, 1333, 1335 and 1337.

As an example, each light-emitting element disposed in the sub-pixel regions 1331, 1333, 1335 and 1337 includes one red R subpixel, one green G subpixel and one blue B subpixel. As described above, the type and number of sub-pixels disposed in one display pixel may be combined in various ways.

The sub-pixel regions 1331, 1333, 1335 and 1337 are disposed farther out from the center 1330-1 of the macro pixel 1330 than a typical sub-pixel region, e.g., 1331-1.

In FIG. 13B, the arrows around the center 1330-1 indicate that the sub-pixel regions 1331, 1333, 1335 and 1337 may be disposed farther apart than a typical sub-pixel region.

FIG. 14 is a drawing for explaining macro pixel driving applicable to the display array configuration of FIG. 13B.

Referring to FIG. 14, the pixel driver 1440 may have the same configuration as the pixel driver 920 of FIG. 9 or the pixel driver 1020 of FIG. 10.

Accordingly, the pixel driver 1440 may include one common element or two common elements. The pixel driver 1440 may include four individual pixel elements.

In addition, pixels Px1*b* and Px2*b* may share a row line 1415 through an electrical wire 1415-1. Pixels Px3*b* and Px4*b* may share a row line 1417 through an electrical wire 1417-1.

Pixels Px1*b* and Px3*b* may share a column line 1405 through an electrical wire 1405-1. Pixels Px2*b* and Px4*b* may share a column line 1407 through an electrical wire 1407-1.

Here, compared to the structure of FIG. 9 or 10, the structure of FIG. 14 has a sub-pixel region more outside. Accordingly, compared to the structure of FIG. 9 or 10, the structure of FIG. 14 may be more advantageous for the arrangement process of the pixel driver 1440.

FIG. 15 is a drawing for explaining another example of the display array configuration according to an embodiment of the present disclosure.

Referring to FIG. 15, the display array according to an embodiment of the present disclosure may include a macro pixel 1510 composed of six display pixels Px1, Px2, Px3, Px4, Px5 and Px6.

Considering the pixel dimension and the fill factor, six or more adjacent pixels may be configured as one macro pixel.

For example, in the case of a mobile display, a sub-pixel region may be increased to increase the fill factor. In addition, sub-pixel regions may be disposed at the outer or corner portions of the display pixel through the transfer process according to an embodiment.

If the fill factor is designed to be close to 1, i.e., to be close to 100%, a macro pixel may be configured in a unit of 8 or more display pixels.

FIG. 16 is a drawing for explaining the concept of display pixel current driving according to an embodiment of the present disclosure.

Referring to FIG. 16, the display pixel 1610 may include a light-emitting element ED and pixel circuits 40 and 50.

Display pixels 1610, 1620, 1630 and 1640 may be display pixels in a macro pixel.

Reference numeral 1600 represents a current supply source. A current supply source 1600 may supply a stable driving current by forming a current mirror with a transistor 1601 in a pixel circuit.

The pixel circuits 40 and 50 may adjust the emission and non-emission of a light emitter in response to a control signal, e.g., a PWM signal.

The pixel circuits 40 and 50 may include a level shifter 1605.

The transistor 1601 may output a driving current. A gate of the transistor 1601 may be connected to a transistor of the current supply source 1600 and may constitute a current mirror circuit with the current supply source 1600.

A transistor additionally provided in the pixel circuits 40 and 50 may be turned on or off according to a voltage output from the level shifter 1605.

The level shifter 1605 may be connected to an output terminal of a Pulse Width Modulation (PWM) controller 1601 and may convert a voltage level of a first PWM signal output by a PWM controller 1641 to generate a second PWM signal. The level shifter 1605 may generate a second PWM signal by converting the first PWM signal to a gate-on voltage level signal capable of turning on a transistor and to a gate-off level signal capable of turning off a transistor.

A pulse voltage level of the second PWM signal output by the level shifter 1605 may be higher than a pulse voltage level of the first PWM signal. The level shifter 1605 may include a boost circuit for boosting an input voltage. The level shifter 1605 may be implemented with a plurality of transistors.

A turn-on time and turn-off time of the transistor during one frame may be determined according to a pulse width of the first PWM signal.

A pixel circuit 40 may store a bit value of data applied from a column driver in a data write period for each frame and generate a first PWM signal based on a bit value and a clock signal in a light emission period.

A pixel circuit 50 may include the PWM controller 1641 and memory 1643.

The PWM controller 1641 may generate a first PWM signal based on a clock signal CK, which is input during a light emission period, and a bit value of data read from the memory 1643.

The PWM controller 1641 may generate a first PWM signal by reading a corresponding data bit value from the memory 1643 when a signal of a subframe clock unit is input.

A PWM controller 501 may control a pulse width of a first PWM signal based on a data bit value of a subframe unit and a signal width of a clock signal.

For example, when a bit value of video data is 1, a pulse output of the PWM signal may be turned on as much as a signal width of the clock signal, and when the bit value of the video data is 0, the pulse output of the PWM signal may be turned off as much as a signal width of the clock signal.

The PWM controller 1641 may include one or more logic circuits (e.g., an OR gate circuit, etc.) implemented with one or more transistors.

FIGS. 17 to 19 are drawings for explaining embodiments of arrangement structures including a display pixel and a pixel driver according to embodiments of the present disclosure.

Referring to FIG. 17, a macro pixel 1700 illustrates an embodiment wherein a region, in which light emitters 1711, 1713, 1715 and 1717 of each display pixel are disposed, and a pixel driver region 1720 are formed on the same layer.

For example, the structure shown in FIG. 17 may be applied to all embodiments shown in FIGS. 8, 9 and 10.

Referring to FIG. 18, a macro pixel 1800 includes a region 1820 in which a common element is disposed; and regions 1831, 1833, 1835 and 1837 in which four individual elements are disposed.

Here, the region 1820 in which a common element is disposed and the regions 1831, 1833, 1835 and 1837 in which four individual elements are disposed may be formed on the same layer. In addition, a region in which light emitters 1811, 1813, 1815 and 1817 of the display pixel are disposed may be formed on the regions 1831, 1833, 1835 and 1837 in which individual elements are disposed.

The structure shown in FIG. 18 may be mainly applied to the embodiments shown in FIGS. 9 and 10.

Referring to FIG. 19, a macro pixel 1900 may be applied to a structure having a high fill factor.

Referring to FIG. 19, a region in which a common element is disposed and a region in which individual elements are disposed may be formed in one region 1920 without distinction.

A region where light emitters 1911, 1913, 1915 and 1917 of the display pixel are disposed may be formed on a different layer from the region 1920 where a pixel driver is disposed.

In FIGS. 17 to 19, At least a portion of the region in which the pixel driver is disposed may be formed to overlap a non-active region of each display pixel. Accordingly, process efficiency and wafer-to-wafer bonding efficiency may be improved.

FIG. 20 is a drawing for explaining a macro pixel and a pixel driver according to an embodiment.

Referring to FIG. 20, a macro pixel 2020 may be the first macro pixel 620 of FIG. 6. In addition, the macro pixel 2020 may be one of the macro pixels shown in FIGS. 8 to 10. Accordingly, reference numeral "A-1" of FIG. 20 may be a common interface-based pixel driver for driving the macro pixel 2020.

A common interface-based pixel driver according to an embodiment of the present disclosure includes a row terminal, a column terminal and a display pixel driving element.

The pixel driving element may drive a plurality of light emitters included in each of a plurality of adjacent display pixels based on signals input through a column terminal and a row terminal.

Here, the pixel driving element may include the common element 710 of FIG. 7. In addition, the pixel driving element may include individual pixel elements for driving each of a plurality of display pixels.

For example, the display pixel driving element may include a first individual pixel element for driving a first display pixel among a plurality of display pixels; and a second individual pixel element for driving a second display pixel among the plural display pixels.

The display pixel driving element may include a first shift register for storing data of the first display pixel among the plural display pixels; and a second shift register for storing data of the second display pixel among the plural display pixels.

A pixel driver A-1 may drive the macro pixel 2020 using a signal that is input through a column line 2011 and a signal that is input using a row line 2001.

The pixel driver A-1 may include 2L individual pixel elements for driving a plurality of light emitters included in each of adjacent 2L (L is an integer) display pixels. Here, each of the 2L individual pixel elements may include a pixel internal memory that stores video data. The pixel internal memory may be a shift register.

Here, a first type pixel driver 2030 has L equal to 1, and a second type pixel driver 2040 has L equal to 2. For example, the first type pixel driver 2030 may be applied to the embodiment shown in FIG. 8 or 9. In addition, the second type pixel driver 2040 may be applied to the embodiment shown in FIG. 10.

The first type pixel driver 2030 and the second type pixel driver 2040 may further include the common element 710 shown in FIG. 7. Hereinafter, an operation of writing data on individual pixel elements and components necessary for a light emission operation are mainly described.

The first type pixel driver 2030 may include a row terminal 2031 connected to a row line 2001 of a row driver.

The first type pixel driver 2030 may include a column terminal 2032 connected to a column line 2011 of the column driver.

The first type pixel driver 2030 may include individual pixel elements A-1-1-1 and A-1-2-1 for driving display pixels 1-1 and 2-1.

The individual pixel element A-1-1-1 may be connected to the column terminal 2032 through a serial line 2033 and may transmit N-bit video data to an individual pixel element A-1-2-1 through a serial line 2037.

The individual pixel elements A-1-1-1 and A-1-2-1 may share signals that is input through the row terminal 2031.

Since the principles of transmitting N-bit video data and sharing of signals input through a row terminal in the first and second types are the same, the structure of only the second type will be described in detail below.

The second type pixel driver 2040 may include 2L individual pixel elements for driving a plurality of light emitters included in each of adjacent 2L (L is 2) display pixels.

A first individual pixel element A-1-1-1 may drive a light emitter included in a display pixel 1-1.

A second individual pixel element A-1-1-2 may drive a light emitter included in a display pixel 1-2.

A third individual pixel element A-1-2-1 may drive a light emitter included in a display pixel 2-1.

A fourth individual pixel element A-1-2-2 may drive a light emitter included in a display pixel 2-2.

The second type pixel driver 2040 may include a row terminal 2041 connected to the row line 2001 of the row driver.

The second type pixel driver 2040 may include a column terminal 2042 connected to the column line 2011 of the column driver.

The first individual pixel element A-1-1-1 is connected to the column terminal 2042 through a serial line 2043. The first individual pixel element A-1-1-1 may include a first shift register capable of storing N-bit video data. The first individual pixel element A-1-1-1 stores N-bit video data by sequentially shifting data that is input by 1 bit through the serial line 2043.

The second individual pixel element A-1-1-2 is connected to the first individual pixel element A-1-1-1 through a serial line 2044. The second individual pixel element A-1-1-2 may include a second shift register capable of storing N-bit video data. Here, a last bit of a first shift register may be connected in series to a first bit of a second shift register.

The third individual pixel element A-1-2-1 is connected to the second individual pixel element A-1-1-2 through a serial line 2045. The third individual pixel element A-1-2-1 may include a third shift register capable of storing N-bit video data. Here, a last bit of the second shift register may be connected in series to a first bit of the third shift register.

The fourth individual pixel element A-1-2-2 is connected to the third individual pixel element A-1-2-1 through a serial line 2047. The fourth individual pixel element A-1-2-2 may include a fourth shift register capable of storing N-bit video data. Here, a last bit of the third shift register may be connected in series to a first bit of the fourth shift register.

Meanwhile, the second type pixel driver 2040 may further include a row terminal 2049 for sharing a low signal for each two individual pixel elements. In the case of sharing a low signal through two row terminals, the pixel elements A-1-1-1 and A-1-1-2 may share signals that are input through the row terminal 2041. In addition, in the case of sharing a low signal through two row terminals, the pixel elements A-1-2-1 and A-1-2-2 may share a signal that is input through the row terminal 2049.

FIGS. 21 and 22 are drawings for explaining a schematic structure and operation method of a pixel internal memory for driving a macro pixel according to an embodiment.

Referring to FIG. 21, a first shift register 2110 may be embedded in the first individual pixel element A-1-1-1 of FIG. 20. A second shift register 2120 may be embedded in the second individual pixel element A-1-1-2 of FIG. 20. A third shift register 2130 may be embedded in the third individual pixel element A-1-2-1 of FIG. 20. A fourth shift register 2140 may be embedded in the fourth individual pixel element A-1-2-2 of FIG. 20.

When a write operation of the column driving circuit starts, video data is input from the first bit 2111 of the first shift register 2110. While the write operation input to the first bit 2111 of the first shift register 2110 is in progress, video data is sequentially shifted and finally stored in a last bit 2141 of the fourth shift register 2140.

The fourth shift register 2140 may further include an end bit 2143. When the data is shifted to the end bit 2143, the write operation for the macro cell is terminated, and the shift operation of each shift register is stopped.

FIG. 23 is a drawing for explaining a write operation and read operation of a pixel internal memory for driving a macro pixel according to an embodiment.

Referring to FIG. 23, reference numeral 2310 represents a timing diagram of a write operation and read operation of the display pixels 1-1 and 1-2 shown in FIG. 20 in one frame.

Reference candidate 2320 represents a timing diagram of a write operation and read operation of the display pixels 2-1 and 2-2 shown in FIG. 20 in one frame.

Reference numeral 2330 represents a timing diagram of a write operation and read operation for a single pixel 1-1 according to a related technology.

Reference numeral 2340 represents a timing diagram of a write operation and read operation for a single pixel 2-1 according to a related technology. Here, the read operation for the single pixel 2-1 may be performed during a time (2355, 2357) where a PWM signal is applied.

When a write operation starts, N-bit data that is input through a column terminal may be shifted from a pixel internal memory of a first individual pixel element to a pixel internal memory of a second individual pixel element at the first line time 2351.

For example, when N is 8, 16 bits of data may be sequentially input during a first line time 2351, 8 bits of data may be stored in the first individual pixel element A-1-1-1, and 8 bits of data may be stored in a second individual pixel element A-1-1-2.

Here, "1 Line time" may be a fixed time determined according to Display Frequency and Resolution. For example, "1 Line time" may be determined by frame frequency/number of lines. Here, the "number of lines" may be N for display pixels disposed in M rows and N columns.

Data stored in the first individual pixel element A-1-1-1 and the second pixel element A-1-1-2 may be shifted to the third individual pixel element A-1-2-1 and the fourth individual pixel element A-1-2-2 during a second line time 2353.

In other words, the third individual pixel element serially connected to the second individual pixel element may receive N-bit data at the second line time 2353 and shift N-bit data to a pixel internal memory of the fourth individual pixel element.

The first individual pixel element and the second individual pixel element may enable the Pulse Width Modulation (PWM) signal, which is input through a row terminal, after a preset time delay.

The preset delay is necessary for effective driving of the macro pixel. For example, in the "1-Line Delay" section, the data shift operation of the third individual pixel element and the fourth individual pixel element may proceed, and a low signal may be shared.

The third individual pixel element and the fourth individual pixel element may enable the PWM signal, which is input through the row terminal, after the second line time when the data shift operation of the pixel internal memory of the fourth individual pixel element is completed.

Accordingly, light-emitting elements in the macro pixel may emit light during the time period 2355 where the PWM signal is applied.

According to an embodiment, it can be confirmed that a write operation for two display pixels 1-1 and 1-2 is performed during the same time as a time where a write operation for a single pixel 1-1 according to a related technology is performed in the 1-1 pixel memory.

FIG. 24 illustrates another embodiment for explaining a write operation and read operation of a pixel internal memory for driving a macro pixel according to an embodiment.

FIG. 24 illustrates an embodiment wherein a low signal is input through the two low terminals 2041 and 2049 of FIG. 20.

Here, a first individual pixel element may receive N bits of data at a first line time 2451 and may shift N bits of data to a pixel internal memory of a second individual pixel element.

In addition, a third individual pixel element connected in series with a second individual pixel element may receive N-bit data at a second line time 2453 and shift N-bit data to a pixel internal memory of the fourth individual pixel element.

When a low signal is input through the two row terminals 2041 and 2049, individual pixel elements may enable a PWM signal without 1 Line Delay unlike the embodiment shown in FIG. 23.

Accordingly, the two pixel displays in the macro pixel may emit light during the time 2453 and time 2455 where the PWM signal is applied.

FIG. 25 is a drawing for explaining a write operation and read operation of a pixel internal memory for two macro pixels according to an embodiment.

FIG. 25 shows an example of driving two macro pixels by applying the second type pixel driver 2040 shown in FIG. 20.

Here, one macro pixel is the macro pixel 2020 shown in FIG. 20, and the other macro pixel is a macro pixel driven by a pixel driver B-1 shown in FIG. 6.

In a first line 2510, data may be stored in individual pixel elements A-1-1-1 and A-1-1-2 for a first line time 2551, and data may be stored in individual pixel element A-1-2-1 and A-1-2-2 of a second line 2520 for a second line time 2551.

In a third line 2530, data may be stored in an individual pixel element for driving a display pixel 3-1 and an individual pixel element driving for a display pixel 3-2 for a third line time 2555.

In a fourth line 2540, data may be stored in an individual pixel element for driving a display pixel 4-1 and an individual pixel element for driving a display pixel 4-2 for a fourth line time 2557.

In one frame, a display pixel 4-1 and a display pixel 4-2 may emit light for a time 2559 where while a PWM signal is enabled.

Referring to FIGS. 7 to 25, a digital display device according to an embodiment may include a pixel cluster including a first pixel and a second pixel.

Here, The pixel driver for driving the pixel cluster may include a first contact point for receiving a PWM driving signal (e.g., 2041) and a second contact point (e.g., 2042) for receiving graduation data of a first pixel and a second pixel.

Here, a pixel driver may be a circuit for driving light emitters of the first pixel and second pixel included in the pixel cluster.

Here, the pixel driver may include individual pixel elements that contain shift registers.

Accordingly, the graduation data may be stored in a shift register, and the pixel driver may PWM-drive the first pixel and the second pixel at the same time.

For example, the pixel driver may include a first shift register for storing graduation data for the first pixel and a second shift register for storing graduation data for the second pixel.

Here, the second shift register may be connected in series with the first shift register, and the first shift register may shift the graduation data for the second display pixel to the second shift register at a first line time.

The pixel driver may receive the graduation data of the first and second pixels through the second contact point, store the graduation data of the first pixel in the first shift register, and store the graduation data of the second pixel in the second shift register.

In addition, The pixel driver may receive the PWM driving signals of the first and second pixels through the first contact point to PWM-drive the first and second pixels at the same time according to the graduation data stored in the first and second shift registers.

Various characteristics of a digital display system can be improved through the embodiments of the present disclosure.

The apparatus described above may be implemented as a hardware component, a software component, and/or a combination of hardware components and software components. For example, the apparatus and components described in the embodiments may be achieved using one or more general purpose or special purpose computers, such as, for example, a processor, a controller, an arithmetic logic unit (ALU), a digital signal processor, a microcomputer, a field programmable array (FPA), a programmable logic unit (PLU), a microprocessor, or any other device capable of executing and responding to instructions. The processing device may execute an operating system (OS) and one or more software applications executing on the operating system. In addition, the processing device may access, store, manipulate, process, and generate data in response to execution of the software. For ease of understanding, the processing apparatus may be described as being used singly, but those skilled in the art will recognize that the processing apparatus may include a plurality of processing elements and/or a plurality of types of processing elements. For example, the processing apparatus may include a plurality of processors or one processor and one controller. Other processing configurations, such as a parallel processor, are also possible.

Although the present disclosure has been described with reference to limited embodiments and drawings, it should be understood by those skilled in the art that various changes and modifications may be made therein. For example, the described techniques may be performed in a different order than the described methods, and/or components of the described systems, structures, devices, circuits, etc., may be combined in a manner that is different from the described method, or appropriate results may be achieved even if replaced by other components or equivalents.

Therefore, other embodiments, other examples, and equivalents to the claims are within the scope of the following claims.

What is claimed is:

1. A cluster pixel circuit for driving a pixel cluster including at least two pixels, the cluster pixel circuit comprising:

a row terminal connected to one row line for receiving a Pulse Width Modulation (PWM) clock signal through the one row line;

a column terminal connected to one column line for receiving N-bit data for each of the at least two pixels through the one column line;

a first individual pixel driver for driving a first pixel in the pixel cluster;

a second individual pixel driver connected to the first individual pixel driver and for driving a second pixel in the pixel cluster; and a common element embedded in the cluster pixel circuit, generating a reference voltage and a reset signal, and outputting the reference voltage and the reset signal to each of the first and second individual pixel drivers, wherein the PWM clock signal is commonly inputted to the first individual pixel driver and the second individual pixel driver through the one row line, and the N-bit data is sequentially inputted to the first individual pixel driver.

2. The pixel driving circuit according to claim 1, wherein each of the individual pixel drivers comprises a pixel internal memory configured to store video data that is input through the column terminal.

3. The pixel driving circuit according to claim 2, wherein N-bit data input through the column terminal is shifted from a pixel internal memory of the first individual pixel driver to a pixel internal memory of the second individual pixel driver at a first line time.

4. A cluster pixel circuit for driving a pixel cluster including at least two pixels, the cluster pixel circuit comprising:

a row terminal connected to a row line for receiving a Pulse Width Modulation (PWM) clock signal;

a column terminal connected to a column line for receiving N-bit data;

a first individual pixel driver for driving a first pixel in the pixel cluster; and a second individual pixel driver connected to the first individual pixel driver and for driving a second pixel in the pixel cluster, wherein the PWM clock signal is commonly inputted to the first individual pixel driver and the second individual pixel driver, and the N-bit data is sequentially inputted to the first individual pixel driver, wherein N-bit data input through the column terminal is shifted from a pixel internal memory of the first individual pixel driver to a pixel internal memory of the second individual pixel driver at a first line time, and wherein the first individual pixel driver and the second individual pixel driver enable a Pulse Width Modulation (PWM) signal input through the row terminal after a preset time delay.

5. The pixel driving circuit according to claim 4, wherein a third individual pixel driver connected in series with the second individual pixel driver receives the N-bit data at a second line time and shifts the N-bit data to a pixel internal memory of a fourth individual pixel driver.

6. The pixel driving circuit according to claim 5, wherein the third individual pixel driver and the fourth individual pixel driver enable a PWM signal input through the row terminal when a data shift operation of the pixel internal memory of the fourth individual pixel driver is completed.

7. A digital display device, comprising:

a pixel cluster comprising a first pixel and a second pixel;

a first contact point for receiving a Pulse Width Modulation (PWM) driving signal;

a second contact point for receiving gradation data for the first pixel and gradation data for the second pixel; and a pixel driver for driving light emitters of the first and second pixels comprised in the pixel cluster based on a signal that is input through the first contact point and the second contact point, wherein the pixel driver comprises, a first individual pixel element for controlling light emission of the light emitter of the first pixel;

a second individual pixel element for controlling light emission of the light emitter of the second pixel; and a common element embedded in the pixel driver, generating a reference voltage and a reset signal, and outputting the reference voltage and the reset signal to each of the first and second individual pixel drivers.

8. The digital display device according to claim 7, wherein the first individual pixel element comprises a first shift register of N bits, and the second individual pixel element comprises a second shift register connected in series with the first shift register.

9. The digital display device according to claim 7, wherein the pixel driver comprises:

a first shift register configured to store the gradation data for the first pixel; and a second shift register configured to store the gradation data for the second pixel.

10. The digital display device according to claim 9, wherein the second shift register is connected in series with the first shift register, and the first shift register shifts the gradation data for the second pixel to the second shift register at a first line time.

11. A digital display device comprising:

a pixel cluster comprising a first pixel and a second pixel;

a first contact point for receiving a Pulse Width Modulation (PWM) driving signal;

a second contact point for receiving gradation data for the first pixel and gradation data for the second pixel; and a pixel driver for driving light emitters of the first and second pixels comprised in the pixel cluster based on a signal that is input through the first contact point and second contact point, wherein the pixel driver comprises a first individual pixel element for controlling light emission of the light emitter of the first pixel and a second individual pixel element for controlling light emission of the light emitter of the second pixel, and wherein the pixel driver comprises:

a first shift register configured to store the gradation data for the first pixel, and a second shift register configured to store the gradation data for the second pixel, and wherein the pixel driver receives the gradation data for the first pixel and the gradation data for the second pixel through the second contact point to store the gradation data for the first pixel in the first shift register and store the gradation data for the second pixel in the second shift register.

12. The digital display device according to claim 11, wherein the pixel driver receives a PWM driving signal of the first and second pixels through the first contact point to simultaneously drive the first and second pixels according to the gradation data for the first pixel stored in the first shift register and the gradation data for the second pixel stored in the second shift register.

13. A digital display device comprising:

a pixel cluster comprising a first pixel and a second pixel;

a first contact point for receiving a Pulse Width Modulation (PWM) driving signal;

a second contact point for receiving gradation data for the first pixel and gradation data for the second pixel; and a pixel driver for driving light emitters of the first and second pixels comprised in the pixel cluster based on a signal that is input through the first contact point and the second contact point, wherein the pixel cluster comprises a first sub-pixel area in which the light emitter of the first pixel is disposed and a second sub-pixel area in which the light emitter of the second pixel is disposed, and the first sub-pixel area and the second sub-pixel area are disposed to be farther out from a center of the pixel cluster than a center of the first pixel or the second pixel.

* * * * *